(12) United States Patent
Evanicky

(10) Patent No.: US 6,816,145 B1
(45) Date of Patent: Nov. 9, 2004

(54) LARGE AREA WIDE ASPECT RATIO FLAT PANEL MONITOR HAVING HIGH RESOLUTION FOR HIGH INFORMATION CONTENT DISPLAY

(75) Inventor: Daniel E. Evanicky, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/120,983

(22) Filed: Jul. 22, 1998

(51) Int. Cl.[7] .............................................. G09G 3/36
(52) U.S. Cl. ...................................... 345/102; 345/87
(58) Field of Search ............................ 345/87, 30, 33, 345/48, 50, 55, 84, 102, 905; 349/142, 62–69

(56) References Cited

U.S. PATENT DOCUMENTS

| | | | |
|---|---|---|---|
| 4,622,584 A | | 11/1986 | Nagasaki et al. ............. 348/69 |
| 4,842,378 A | | 6/1989 | Flasck et al. .................. 349/70 |
| 5,143,433 A | * | 9/1992 | Farrell .......................... 362/29 |
| 5,202,950 A | * | 4/1993 | Arego et al. ................. 385/146 |
| 5,206,673 A | | 4/1993 | Kawahara et al. ............ 353/98 |
| 5,207,493 A | | 5/1993 | Murase et al. ................ 362/31 |
| 5,333,073 A | | 7/1994 | Suzuki .......................... 349/59 |
| 5,353,075 A | | 10/1994 | Conner et al. .............. 353/122 |
| 5,381,309 A | | 1/1995 | Borchardt .................... 362/31 |
| 5,394,308 A | | 2/1995 | Watanabe et al. ............. 362/31 |

(List continued on next page.)

FOREIGN PATENT DOCUMENTS

| | | | | |
|---|---|---|---|---|
| EP | 0479551 A2 | | 4/1992 | ......... G02F/1/1335 |
| EP | 0482620 A3 | | 4/1992 | ............ G02B/5/30 |
| JP | 1-316790 | | 12/1989 | ............ G09F/9/00 |
| JP | 4-149417 | | 5/1992 | ......... G03B/21/132 |
| JP | 06175124 A | * | 6/1994 | ...... G02F/001/1335 |

OTHER PUBLICATIONS

Higuchi et al., Development of a 15.5–in. High–Definition Wide–Viewing–Angle TFT–LCD for HDTV, Display Device Engineering Laboratory, Toshiba Corp., Kanagawa, Japan.

Higuchi T. et al. "Development of a 15.5–in. High–Definition Wide–Viewing–Angle TFT–LCD for HDTV" 1996 SID International Symposium, Digest of Technical Papers, First Edition Proceedings of SID 96, San Diego, CA May 12–17, 1996, pp. 89–92.

"White Balance Control Methods on Liquid Crystal Display", IBM Technical Disclosure Bulletin, vol. 37, No. 11, Nov. 1, 1994, p. 425/426.

*Primary Examiner*—Alexander Eisen
(74) *Attorney, Agent, or Firm*—Baker Botts L.L.P.

(57) ABSTRACT

A large area wide aspect ratio flat panel display having high resolution for high information content display. The present invention includes a liquid crystal flat panel display monitor having a wide aspect ratio. In one embodiment, the wide aspect ratio is substantially 1.6:1, having 1,600 pixels across the horizontal and 1,024 across the vertical. In this embodiment, the present invention is an SXGA-wide flat panel display monitor having high resolution for high information content display. The monitor of the present invention is particularly well suited for the display of text, graphics and other types of still and/or motion audio/visual works. The wide aspect ratio allows the display of multiple pages, side-by-side, thereby facilitating certain tasks such as desktop publishing, presentation of interactive windows, presentation of menus, chart viewing, digital photography, tactical military displays and weather and aircraft monitoring. The novel wide aspect ratio monitor also provides compensation film layers, rather than dual domain technology, for providing off axis viewing capability in both the horizontal and vertical directions. The novel wide aspect ratio monitor also provides white color balance adjustment. The white color balancing mechanisms include the provision of two or more light sources, of differing color temperature, whose brightness is varied (and distributed through a light distribution mechanism) to adjust color temperature without altering the grayscale resolution of the RGB colors.

30 Claims, 14 Drawing Sheets

U.S. PATENT DOCUMENTS

| | | | |
|---|---|---|---|
| 5,404,185 A | 4/1995 | Vogeley et al. | 353/122 |
| 5,461,400 A * | 10/1995 | Ishii et al. | 345/182 |
| 5,477,423 A | 12/1995 | Fredriksz et al. | 362/31 |
| 5,479,328 A | 12/1995 | Lee et al. | 362/216 |
| 5,485,354 A | 1/1996 | Ciupke et al. | 362/31 |
| 5,548,670 A | 8/1996 | Koike | 385/27 |
| 5,550,657 A | 8/1996 | Tanaka et al. | 349/62 |
| 5,568,164 A | 10/1996 | Ogawa | 345/145 |
| 5,589,320 A * | 12/1996 | Ohnishi et al. | 430/321 |
| 5,593,221 A | 1/1997 | Evanicky et al. | 353/122 |
| 5,642,129 A * | 6/1997 | Zavracky et al. | 345/100 |
| 5,654,779 A | 8/1997 | Nakayama et al. | 349/58 |
| 5,661,839 A | 8/1997 | Whitehead | 385/131 |
| 5,688,035 A | 11/1997 | Kashima et al. | 362/31 |
| 5,696,529 A | 12/1997 | Evanicky et al. | 345/126 |
| 5,786,801 A * | 7/1998 | Ichise | 345/102 |
| 5,805,415 A * | 9/1998 | Tran et al. | 361/681 |
| 5,949,511 A * | 9/1999 | Park | 349/139 |
| 6,003,015 A * | 12/1999 | Kang et al. | 705/15 |
| 6,044,196 A * | 3/2000 | Winston et al. | 385/146 |
| 6,064,373 A * | 5/2000 | Ditzik | 345/173 |
| 6,069,620 A * | 5/2000 | Nakamura et al. | 345/214 |
| 6,243,059 B1 * | 6/2001 | Greene et al. | 345/88 |
| 6,313,891 B1 * | 11/2001 | Nagakubo et al. | 349/65 |
| 6,421,039 B1 * | 7/2002 | Moon et al. | 345/100 |

* cited by examiner

FIG. 20

LARGE AREA WIDE ASPECT RATIO FLAT PANEL MONITOR HAVING HIGH RESOLUTION FOR HIGH INFORMATION CONTENT DISPLAY

RELATED CASE

The instant application is a continuation-in-part of U.S. patent application Ser. No. 09/087,745, filed on May 29, 1998, and entitled "A Multiple Light Source Color Balancing System Within A Liquid Crystal Flat Panel Display," by Evanicky and assigned to the assignee of the present invention.

BACKGROUND OF THE INVENTION (1) Field of the Invention

The present invention relates to the field of display devices. More specifically, the present invention relates to the field of flat panel display devices utilizing liquid crystal display (LCD) technology.

(2) Prior Art

Flat panel displays or liquid crystal displays (LCDs) are popular display devices for conveying information generated by a computer system. Many types of flat panel displays are typically back-lit or edge-lit. That is, a source of illumination is placed behind the LCD layers to facilitate visualization of the resultant image. Flat panel LCD units are used today in many applications including the computer component and computer peripheral industries where flat panel LCD units are an excellent display choice for lap-top computers and other portable electronic devices.

In the field of flat panel LCD unit devices, much like conventional cathode ray tube (CRT) displays, a white pixel is composed of a red, a green and a blue color point or "spot." When each color point of the pixel is illuminated simultaneously and with the appropriate intensity, white can be perceived by the viewer at the pixel's screen position. To produce different colors at the pixel, the intensities (e.g., brightness) to which the red, green and blue points are driven are altered in well known fashions. The separate red, green and blue data that correspond to the color intensities of a particular pixel are called the pixel's color data. Color data is often called gray scale data. The degree to which different colors can be achieved by a pixel is referred to as gray scale resolution. Gray scale resolution is directly related to the amount of different intensities to which each red, green and blue point can be driven.

The aspect ratio of a monitor refers to the number of pixels the monitor provides along the horizontal direction with respect to the number of pixels the monitor provides along the vertical direction. Assuming that the pixels are square, e.g., the pitch between each RGB triad is the same in both horizontal and vertical directions, the aspect ratio can also refer to the horizontal length with respect to the vertical height. Monitors not having a wide aspect ratio include the VGA standard, the SVGA standard, the XGA standard, SXGA standard and the UXGA standard. For instance, the VGA standard has 640 pixels by 480 pixels having a 1.3 to 1 aspect ratio ("1.3:1"). The SVGA standard has 800 pixels by 600 pixels having an aspect ratio of 1.3:1. The XGA standard has 1024 pixels by 768 pixels having an aspect ratio of 1.3:1. The SXGA standard has 1280 pixels by 1024 pixels having an aspect ratio of 1.25 to 1 ("1.25:1"). And, the UXGA standard has 1600 pixels by 1200 pixels having an aspect ratio of 1.3:1. The VGA standard, the SVGA standard, the XGA standard, SXGA standard and the UXGA standard have been commonly implemented in CRT display technology and also in some flat panel display technologies.

The areas of photography and publishing require the manipulation of high information content images and text. These areas are limited in the amount of information that can be displayed at one time by the size and aspect ratio of their display devices, typically CRT displays. It would be preferable, within these industries, to be able to display multiple photos, pages of text, or images side by side for either absorbing information at a higher rate or comparing them with each other, e.g., by using a wide aspect ratio display.

Wide aspect ratio displays include the high definition television standard, or HDTV standard, having 1920 pixels by 1080 pixels with an aspect ratio of 1.9 to 1 ("1.9:1"). Also, the UXGA-Wide standard is a wide aspect ratio display and has 1920 pixels by 1200 pixels with aspect ratio of 1.6 to 1 ("1.6:1"). The SXGA-Wide standard is a wide aspect ratio display and has 1600×1024 pixels with an aspect ratio of 1.6:1. And the XGA-Wide standard is a wide-aspect ratio display and has 1280 pixels by 768 pixels having a 1.7 to 1 aspect ratio ("1.7:1"). However, CRT monitors have difficulty in displaying information in a wide aspect ratio format for several reasons. First, because the bulb of a CRT encloses a large volume of high vacuum, it is structurally unsound for the bulb to deviate from a shape roughly square in cross section.

Second, as shown in FIG. 1, CRT display technology has some trouble individually addressing the edge located pixels 14a and 14c in a wide aspect display format. FIG. 1 illustrates a top view of a cathode ray tube 10 that can be used for a wide aspect ratio CRT display including an electron gun 12 with beam directing magnets 5. Because each phosphor dot in a CRT 10 is addressed by a beam from one of three electron guns 12 being fired from a common point located behind but centered over the active area 14, addressing a dot at the extreme edge 14a of the screen or at the corners is very difficult. This is because of the oblique angle that the beam 12 must make with the area surface of the phosphor screen 14 and its shadow mask which can cause scanning errors. These errors result in nonuniform color and/or brightness of the displayed image.

Specifically, as the aspect ratio of the CRT increases, the angle at 18 becomes larger. As angle 18 becomes larger, the pixels 14a, which are located along the edge of the screen within phosphor layer 14, become more difficult for the beam 12a of the electron gun 12 to individually resolve. As a result, pixel cross-over or "bleeding" may occur for the pixels located at the edges of the screen. This bleeding does not occur with the pixels 14b which are located in the screen center because beam 12b can individually resolve pixels 14b. The result can be a non-uniform image which is very disadvantageous. One way to resolve this problem within CRT displays is to place the electron gun 12 back farther away from phosphor layer 14 thereby decreasing the maximum angle 18 for edge-located pixels 14a and 14c. However, this solution unfortunately leads to heavier, larger, bulkier glass leading to larger and more expensive CRT displays. The larger the vacuum tube 15 becomes, the harder it is to maintain the vacuum seal.

Another way to solve the above problem of individually addressing edge-located pixels is to slightly curve the display screen as shown in FIG. 1 to assist electron gun 12 in resolving the edge located pixels 14a and 14c. However, commercially a flat screen is the first choice for viewing images, not a curved screen, which tends to distort images and text displayed thereon. A third manner in which to solve the above problem is to alter the pixel density of the pixels located along the edge (e.g., pixels 14a and 14c) with respect to the pixel density of the center located pixels 14b. In other words, this solution increases the pixel pitch (e.g., distance from pixel center to pixel center) for pixels 14a and for pixels 14c compared to the center pixels 14b. For instance, pixel pitch for center pixels 14b is 0.25 mm and pixel pitch for corner pixels 14a is 0.28 mm in some prior art CRT displays. By increasing the pixel pitch for the edge located pixels 14a and 14c, the electron gun 1.2 can better resolve individual edge located pixels 14a and 14c. However, this solution adds the unfortunate side-effect of producing a non-uniform image with noticeable non-uniformities (e.g., non-linearity) located along the screen periphery.

In either of the solutions described above, wide aspect ratios CRTs are large and bulky. It would be advantageous to provide a wide aspect CRT that avoids the above problems. Liquid crystal flat panel displays have been used in the past. For example, U.S. Pat. Nos. 5,696,529 and 5,593,221 describe a flat panel display. However, LCD flat panel displays as needed in desktop publishing and other high quality image applications have heretofore not been manufactured with a wide aspect ratio.

Accordingly, the present invention offers a wide aspect ratio display monitor that is not bulky or heavy and can be readily handled. Further, the present invention offers a wide aspect ratio display monitor that displays a uniform image having uniform pixel pitch throughout the display screen. The present invention offers a wide aspect ratio display monitor that has high resolution and is capable of displaying high information content for text, graphics and other multimedia applications requiring high image quality. These and other advantages of the present invention not specifically described above will become clear within discussions of the present invention herein.

SUMMARY OF THE INVENTION

A wide aspect ratio flat panel display is described herein having high resolution for high information content display. The high resolution flat panel display with wide aspect ratio, of the present invention, readily solves the above problems associated with CRT displays. The flat panel display of the present invention is digitally addressed in an (x, y) matrix of pixels over the entire area of the display rather than from a single point. Therefore, addressing the extreme right/left edges or the corners of the display is not more difficult than addressing the pixels at the center of the screen. Also, since the pixels of the display are positioned in a definite, permanent location and not dependent upon the stability, intensity and accuracy of a traveling Gaussian beam, the image of the present invention is inherently more stable. Flat panel displays are also brighter because their light source is independent from its pixel addressing source. Since the body color of CRT phosphors is inherently white, liquid crystal flat panel displays can achieve a much higher contrast ratio which makes the information on the screen easier to discern. This results in much less eye fatigue for a desktop publishing user who often stares for hours at the display screen. Additionally, the present invention couples the above advantageous with white balance mechanisms that do not alter the dynamic grayscale range of the RGB colors. Therefore, the flat panel display of the present invention is ideally suited to high information content displays, e.g., for desktop publishing, tactical displays, photography, etc.

The present invention includes a large display area a liquid crystal flat panel display monitor having an aspect ratio that is greater than 1.3:1. In one embodiment, the aspect ratio is substantially 1.6:1, having 1,600 pixels across the horizontal and 1,024 pixels across the vertical. In this embodiment, the present invention is an SXGA-wide flat panel display monitor having high resolution for high information content display. The monitor of the present invention is particularly well suited for the display of text, graphics and other types of still and/or motion audio/visual works. The wide aspect ratio allows the display of multiple pages, side-by-side, thereby facilitating certain tasks such as desktop publishing, presentation of interactive windows, presentation of menus, chart viewing, digital photography, tactical military displays and weather and aircraft monitoring. The novel wide aspect ratio monitor also provides compensation film layers, rather than dual domain technology, for providing off axis viewing capability in the horizontal and vertical axis. The novel wide aspect ratio monitor also provides color balance adjustment. The color balancing mechanisms include the provision of two or more light sources, of differing color temperature, whose brightness is varied (and distributed through a light distribution mechanism) to adjust color temperature without altering the grayscale dynamic range of the RGB colors.

Multiple light source systems are described herein for color balancing within a liquid crystal flat panel display unit. The present invention also includes a method and system for altering the brightness of two or more light sources, having differing color temperatures, thereby providing color balancing of a liquid crystal display (LCD) unit within a given color temperature range. The embodiments operate for both edge and backlighting systems. In one embodiment, two planar light pipes are positioned, a first over a second, with an air gap between. The light pipes distribute light uniformly and independently of each other. The first light pipe is optically coupled along one edge to receive light from a first light source having an overall color temperature above the predetermined range (e.g., the "blue" light) and the second light pipe is optically coupled along one edge to receive light from a second light source having an overall color temperature below the predetermined range (e.g., the "red" light). The color temperatures of the first and second light sources are selected such that the overall color temperature of the LCD can vary within the predetermined range by altering the driving voltages of the first and second light sources. In effect, the LCD color temperature is altered, without altering the grayscale dynamic range of the screen colors, by selectively dimming the brightness of one or the other of the light sources so that the overall contribution matches the desired LCD color temperature.

Specifically, one embodiment of the present invention includes a monitor comprising: a) a large area wide aspect ratio liquid crystal flat panel display screen, the large area wide aspect ratio liquid crystal flat panel display screen having high resolution for displaying high information content, the large area liquid crystal flat panel display screen comprising optical compensation film layers for providing increased off axis angle viewing capability in the horizontal and vertical directions; and b) electronic circuitry for receiving signals from a digital computer system and for driving the wide aspect ratio liquid crystal flat panel display screen. Embodiments include the above and wherein the wide aspect ratio liquid crystal flat panel display screen has an aspect ratio of 1.6:1. Embodiments include the above and wherein the high information content includes text information and graphics image information. Embodiments include the above and wherein the large area wide aspect liquid crystal flat panel display screen comprises an in-plane switching liquid crystal layer for improved viewing angle. Embodiments also include a display screen having an antiferroelectric layer.

Embodiments include the above and wherein the large area wide aspect ratio liquid crystal flat panel display screen is non-emissive and further comprises: a first light source of a first color temperature; and a second light source of a second color temperature different from the first color temperature, the first and second light sources positioned to illuminate the wide aspect ratio liquid crystal flat panel display screen with light having a net color temperature that is dependent on an intensity of the first light source and an intensity of the second light source wherein the first and the second light sources alter the net color temperature of the light, within a predetermined color temperature range, by controlling the intensity of the first light source and the intensity of the second light source.

BRIEF DESCRIPTION OF THE DRAWINGS

FIG. 20 is a signal diagram of color signal assignments for red, green and blue transistors within the wide aspect ratio flat panel display of the present invention.

DETAILED DESCRIPTION OF THE INVENTION

In the following detailed description of the present invention, a flat panel liquid crystal monitor having a large area a wide aspect ratio display screen that has high resolution for display of high information content, numerous specific details are set forth in order to provide a thorough understanding of the present invention. However, it will be obvious to one skilled in the art that the present invention may be practiced without these specific details or with certain alternative equivalent circuits and methods to those described herein. In other instances, well known methods, procedures, components, and circuits have not been described in detail as not to unnecessarily obscure aspects of the present invention.

Figure 1:
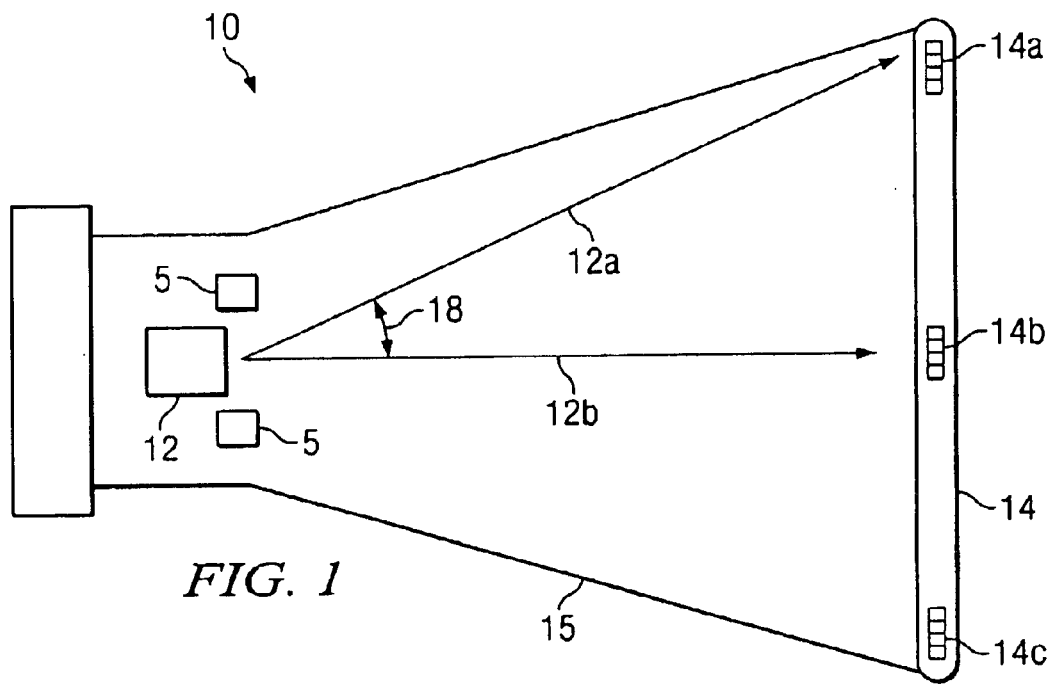
FIG. 1 is a cross sectional top view of a cathode ray tube of the prior art.
Figure 2:
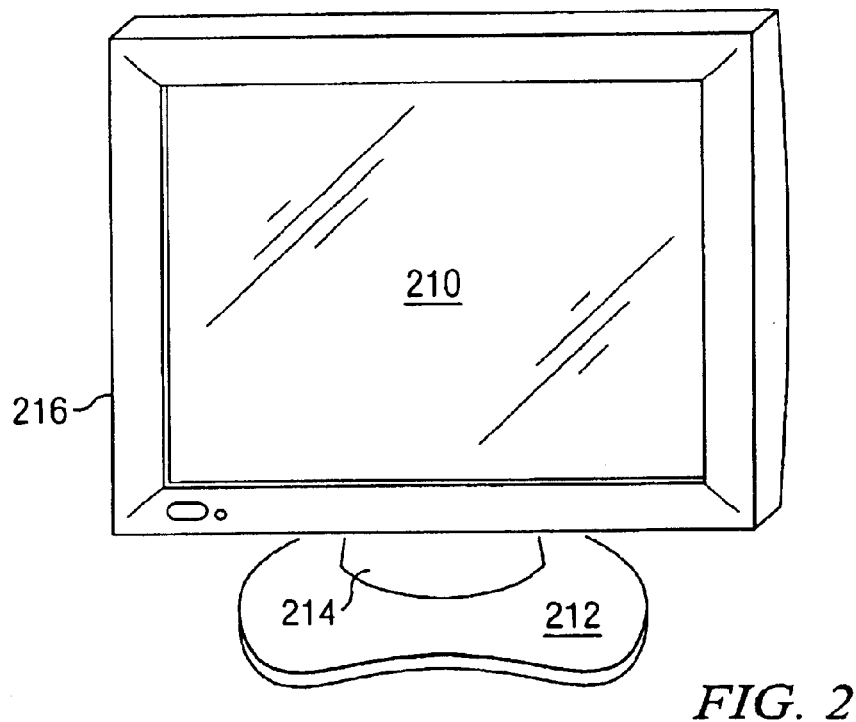
FIG. 2 illustrates a display assembly of the present invention including wide aspect ratio display, stand and base components.

FIG. 2 illustrates a monitor 216 in accordance with the present invention. The monitor 216 includes a display screen 210 for viewing high information content display. The flat panel display screen 210 ("display 210") of the present invention is digitally addressed in an (x, y) matrix of pixels over the entire area of the display rather than from a single point. Display screen 210 includes a thin film transistor (TFT) a liquid crystal layer and a color filter layer. The monitor 216 is coupled to a height adjustable stand 214 that is supported by base 212. Stand 214 (or "tower") allows both elevation and tilt adjustments. The monitor 216 of the present invention is a large area wide aspect ratio flat panel monitor having high resolution for the display of high information content, such as graphics images and/or textual information including alphanumeric characters.

The monitor 216, in one implementation, is high resolution supporting the SXGA-Wide display format. The SXGA-Wide display format has 1,600 pixels across the horizontal dimension and 1,024 pixels down the vertical dimension. In one embodiment, the pixel pitch of monitor 216 is uniform over the screen area of display 210 and the pixel pitch is substantially 0.231 mm (e.g., measured from pixel center to pixel center). In this embodiment, the horizontal dimension of screen 210 is approximately 369.6 mm and the vertical dimension is approximately 236.54 mm. The amounts to a large viewing area of approximately 874 square cm of display area.

The aspect ratio of the SXGA-Wide compliant implementation of the monitor of the present invention is approximately 1.6:1. Within the context of the present invention, an aspect ratio greater than 1.3:1 is considered to be a wide aspect ratio. The present invention having a display screen of 369.6 mm by 236.54 mm is therefore a large viewing area wide aspect ratio flat panel display unit. Because the pixel pitch (e.g., the distance between pixel centers) of the monitor 216 is 0.231 mm, it is very well suited for the display of textual information (e.g., alphanumeric characters) as well as graphic images, both being high information content. Therefore, the monitor 216 of the present invention is well suited for desktop publishing applications, high quality graphics applications, photography applications, tactical display and monitoring, etc.

The present invention is well suited to operate with pixel pitches within the range of 0.22 mm and 0.26 mm. For the display of high information content images, a certain range of pixel pitches is preferred, e.g., between 0.22 mm and 0.26 mm. Below 0.22 mm, the text becomes difficult to read and above 0.26 mm, or so, the images become "pixellated" or "jaggies" can be seen when diagonal lines are displayed. This is due to the non-Gaussian viewing profile of LCD pixels where the corners are easily seen as the centers.

The problems associated with wide aspect ratio CRT displays, as discussed above in the background section herein, are obviated in the monitor of the present invention by use of flat panel display technology. In one embodiment, the display screen 210 utilizes liquid crystal display technology having pixels arranged in red, green, blue (RGB) stripes and is capable of displaying 16.7 million colors. Due to the application of flat panel display technology, the monitor 216 of the present invention is light weight and avoids the use of any vacuum bulbs or other heavy glass structures required of and used by the prior art CRT wide aspect ratio displays. Moreover, because the monitor 216 of the present invention does not utilize an electron gun for rasterizing the screen, the pixel pitch is uniform across the entire area of the monitor 216 in accordance with the present invention and does not therefore vary around the periphery of the display screen 210. Additionally, because it does not use an electron beam to energize each red, green and blue phosphor sub pixel, the brightness of each sub pixel area is uniform rather than Guassian.

Figure 3:
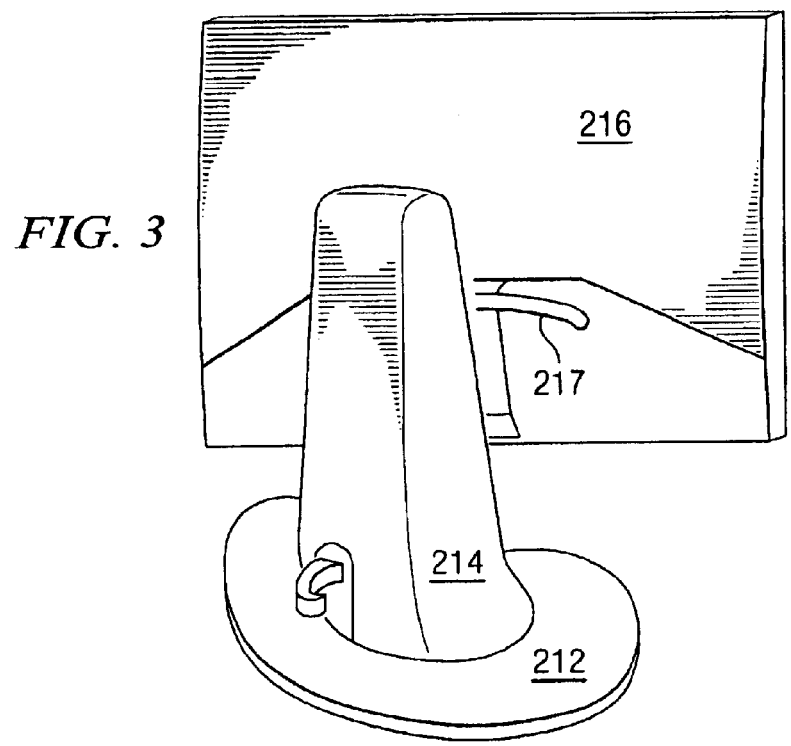
FIG. 3 illustrates a rear view of the display assembly of the present invention.

FIG. 3 illustrates a rear view of the monitor 216 of the present invention and also illustrates the rear side of the height adjustable stand 214 (including adjustment lever 216) and base 212. By interfacing with lever 217, the height orientations of the monitor 216 can be adjusted through various degrees of freedom that are described in more detail in copending U.S. patent application Ser. No. 09/120,962, filed on Jul. 22, 1998, entitled Flat Panel Display and Stand with Vertical Adjustment and Tilt Adjustment, by Evanicky, and assigned to the assignee of the present invention. For instance, tilt for monitor 216 is provided from −5 to 15 degrees tilt angle. The tilt orientation can be manipulated by rotating the display case.

Figure 4:
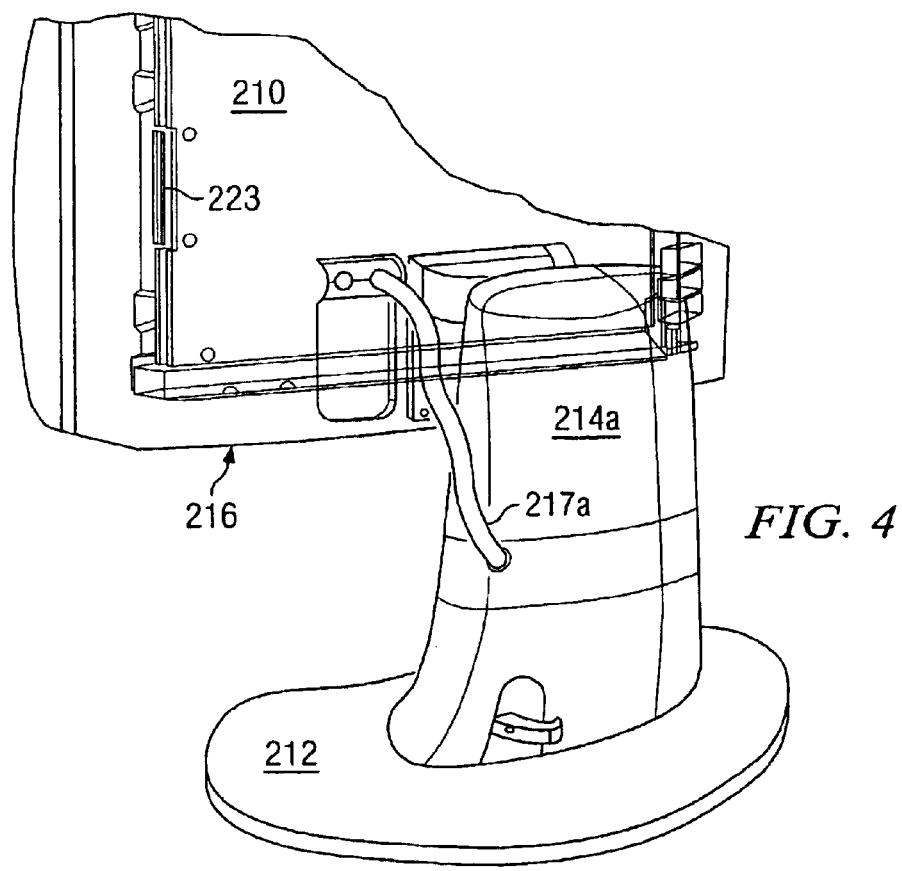
FIG. 4 illustrates a more detailed rear view of the display assembly of the present invention with all lines visible in a transparent fashion.

FIG. 4 illustrates a rear view of the monitor 216 (with no hidden lines) and a more detailed embodiment of the stand 214a. Also shown is a more detailed embodiment of the lever 217a. The base 212 is also shown. Shown in more detail is the metal bezel 223 surrounding the periphery of screen 210. The module bezel 223 supports both the flat panel display screen 210 as well as driver circuitry (not shown) used by the present invention for generating high information content images on the flat panel display screen 210. A cable from the host can be "dressed" by a feature within the stand 214a or the base 212. However, these components do not play any part in receiving information originating from the host (e.g., a computer system) because the display case is wall mountable and is therefore capable of operating without the base 212 and the stand 214a.

Figure 5:
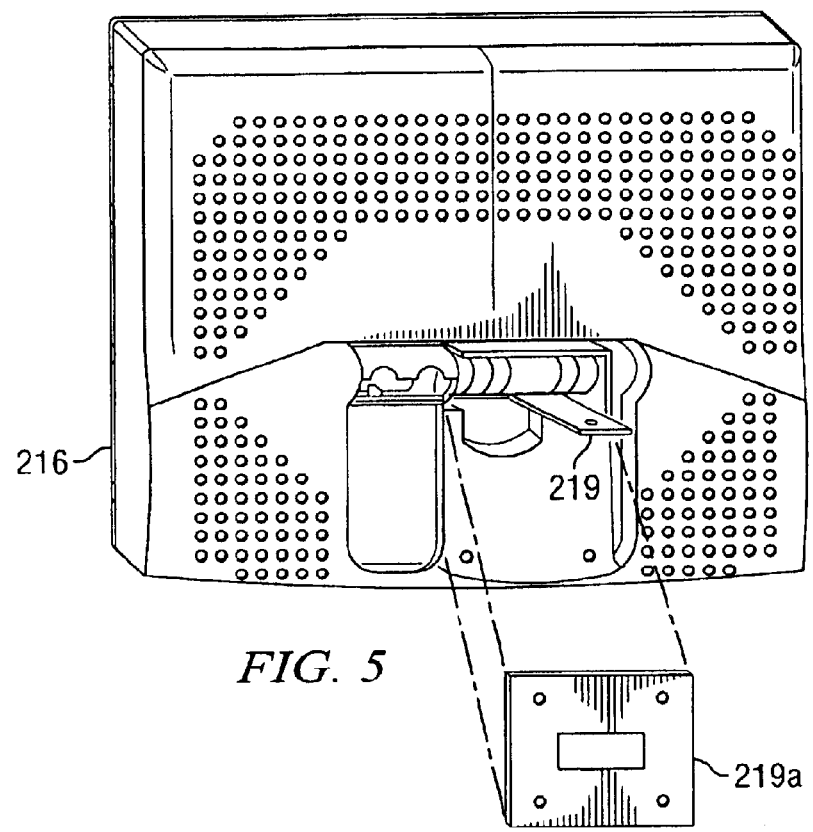
FIG. 5 is a perspective view of the rear case bezel of the wide aspect ratio LCD monitor of the present invention.

FIG. 5 illustrates the rear display case bezel and shows that the monitor 216 of the present invention is removable from the stand 214. By removing the monitor 216 from stand 214, the light weight flat panel monitor 216 of the present invention can readily be mounted onto a wall or other structure using mounting bracket 219 or mounting plate 219a for a swing arm mount. In either the wall mount configuration or the stand mount configuration, a cable (not shown) is used to connect the monitor 216 with an information origination source (e.g., a computer system). Therefore, the present invention provides a large viewing area, high resolution, wide aspect ratio flat panel monitor 216 that is readily capable of being wall-mounted or swing arm or stand-mounted as preferred by a user or a particular application.

Figure 6:
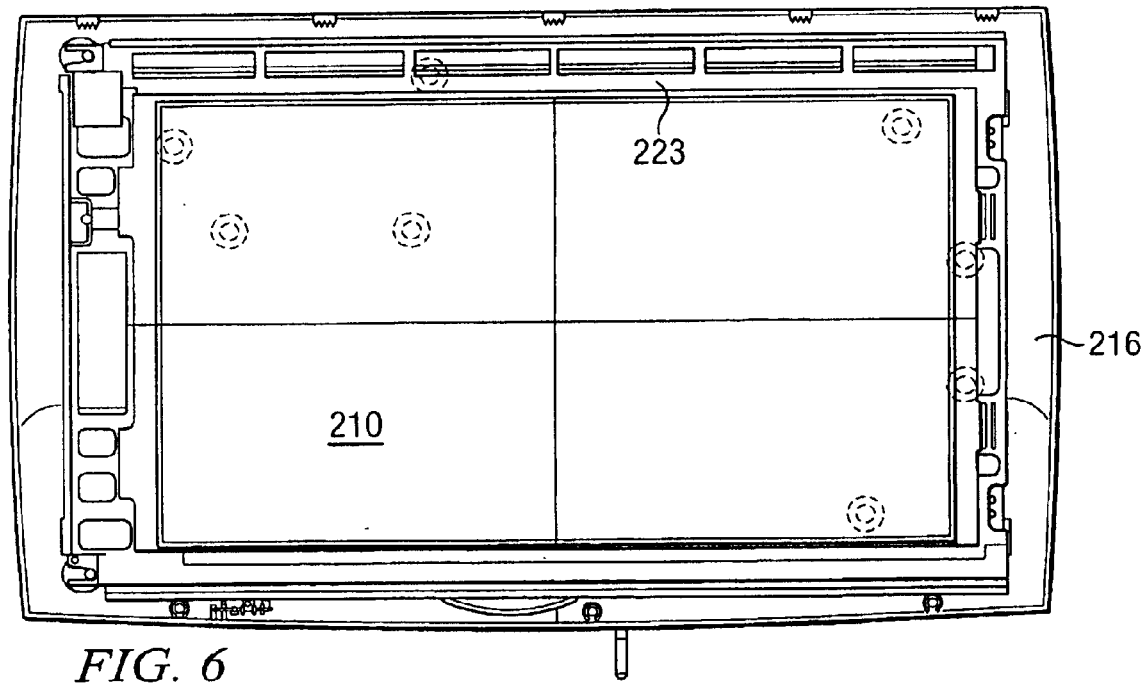
FIG. 6 is a plane view of the wide aspect ratio LCD monitor (showing module bezel) in accordance with the present invention.

FIG. 6 is a plane view of the monitor 216 of the present invention also illustrating the display screen 210 inserted into and supported by the bezel 223. In this view, the horizontal dimension of one implementation of display screen 210 is approximately 369.6 mm and the vertical dimension is 236.54 mm. In this configuration, flat panel monitor 216 provides an excellent large viewing screen area wide aspect ratio monitor for the display of high information content.

Figure 7:
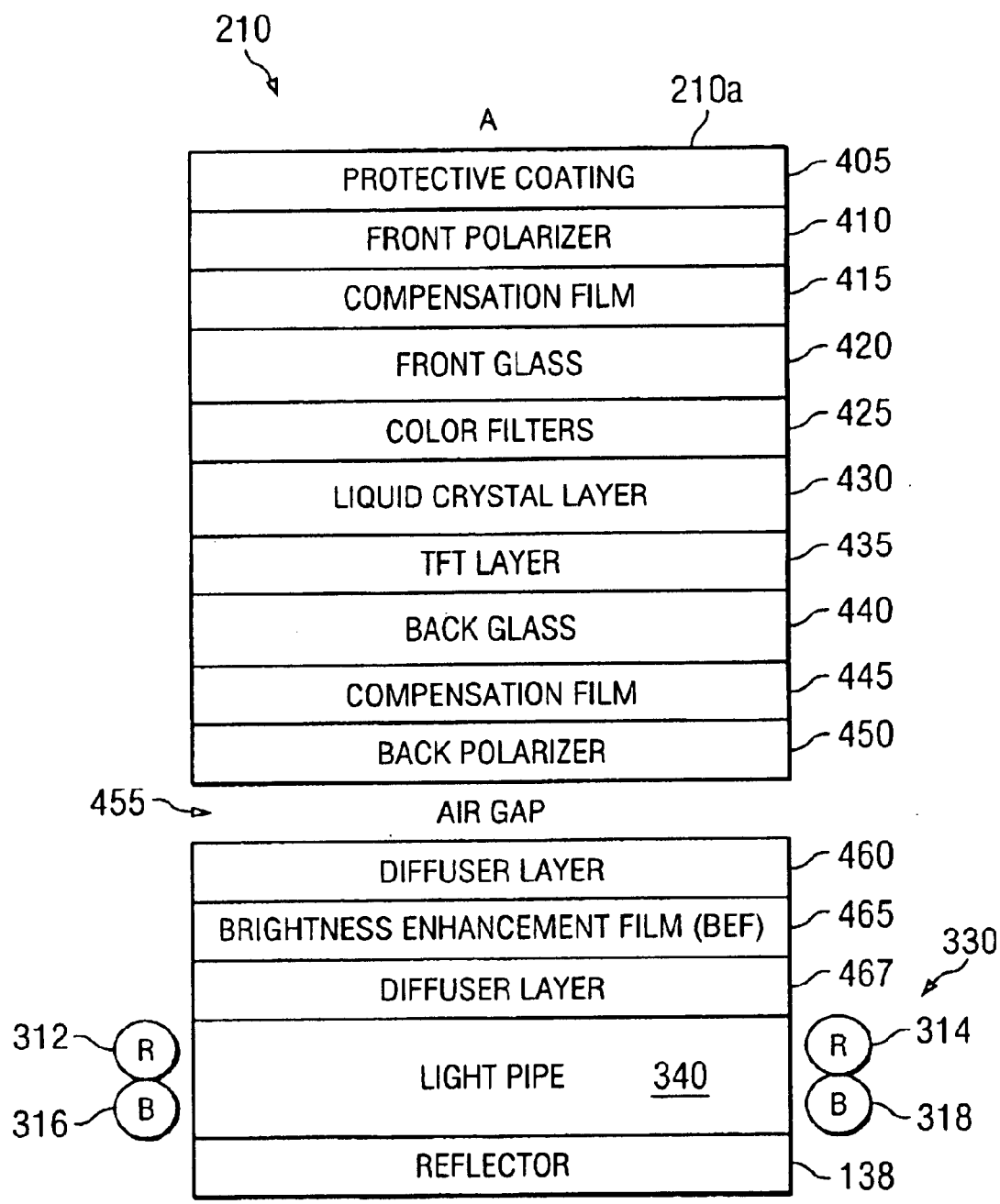
FIG. 7 is a cross section through the layers of the wide aspect ratio liquid crystal display of the preferred embodiment of the present invention.

FIG. 7 is a cross section of the layers of the flat panel display screen 210 in accordance with the preferred embodiment of the present invention. The flat panel display 210 can be used with a fixed-in-place backlighting unit or can be used with a removable backlighting assembly. Also, although FIG. 7 illustrates an edge lighting embodiment, display 210 can also be directly backlit as described further below. The layers of display screen 210 are described from the bottom up ending with the viewed surface 210a.

Figure 9:
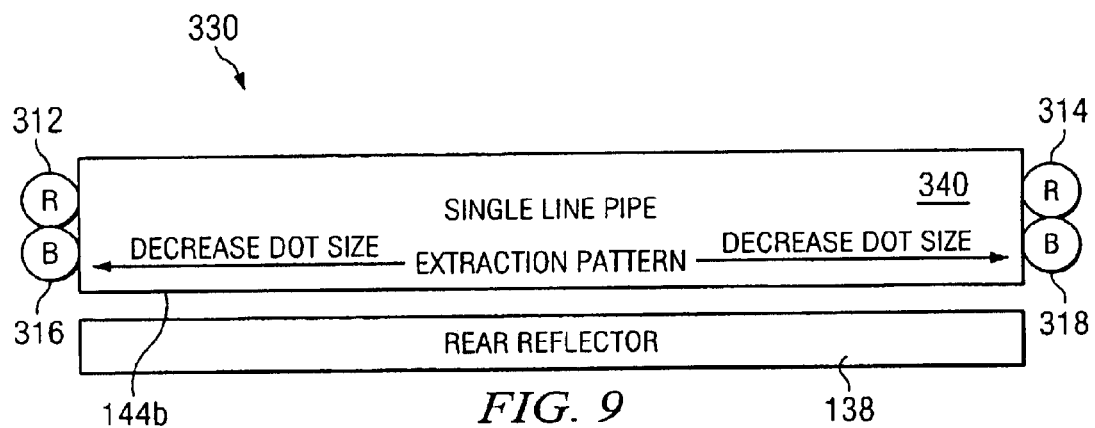
FIG. 9 is a cross sectional diagram of a lighting configuration of the LCD panel embodiment of FIG. 7 of the present invention having a single light pipe and four light sources, two blue sources and two red sources.

The flat panel display 210, in accordance with one embodiment of the present invention, provides white balance adjustment by independently varying the brightness of two pairs of light sources (e.g., CCF tubes) 312 and 316 (one pair) and tubes 314 and 318 (another pair) that belong to a lighting configuration 330 (FIG. 9). For a predetermined range of color temperatures, having a minimum temperature (e.g., 5,000 K) and a maximum temperature (e.g., 7,000 K), the red light sources 312, 314 are provided that have a wavelength spectrum with an overall color temperature less than the minimum temperature of the predetermined range; herein, a light source with this characteristic is called the "red" light source for convenience. Also, a pair of blue light sources 316, 318 is provided that have a wavelength spectrum with an overall color temperature that is greater than the maximum temperature of the predetermined range; herein, a light source with this characteristic is called the "blue" light source for convenience.

In the lighting configuration 330 shown in FIG. 7, the red light sources 312 and 314 are optically coupled to provide light to a planar light pipe 340 composed of acrylic in one embodiment. This arrangement is also described in copending U.S. patent application Ser. No. 09/087,745, filed on May 29, 1998, and entitled "A Multiple Light Source Color Balancing System Within A Liquid Crystal Flat Panel Display," by Evanicky and assigned to the assignee of the present invention and incorporated herein. The red light sources 312 and 314 are positioned along an edge of the light pipe 340. In FIG. 7, only cross sections of this planar light pipe and the light sources are shown. Likewise, the blue light sources 316 and 318 are optically coupled to provide light to the planar light pipe 340 and are positioned along an edge of the light pipe 340. Only cross sections of this planar light pipe and these light sources are shown. In the embodiment 330 of FIG. 7, the light sources are long thin tubes which are positioned on opposite sides of the planar light pipe 340. The light sources are positioned to be substantially parallel with each other. The power supply for each light source pair receives a separate voltage signal for independently controlling its brightness with respect to the other light source pair. It is appreciated that the positions of the red tubes and the blue tubes can be switched without departing from the scope of the invention.

Within display screen 210 of FIG. 7, a rear reflector layer 138 is positioned on one side of the light pipe. On the other side of the light pipe, a lower diffuser layer 467 (mylar) is positioned next to one or more brightness enhancement layers (BEFs) 465. The lower diffuser layer in one embodiment is D121 which has greater diffusion to hide and make the extraction pattern more uniform. An upper diffuser layer 460 is then used. Layer 460 also doubles as a protective layer. The upper diffuser layer in one embodiment is D177UE which has a relatively smaller haze value but higher transmissivity. Its purpose is to protect the BEF layer 465 and not interfere by causing optical fringes. The BEF layer 465 increases light to the display by redirecting light radiating at extreme angles that would ordinarily be lost.

An air gap 455 is then disposed. Layer 460 is then followed by a back or rear polarizer layer 450 that is positioned next to the air gap 455. The display screen 210 includes the back polarizer layer 450 followed by compensation film 445 which is followed by a back glass layer 440. In one embodiment, birefringence compensation film is used for layer 445 to improve viewing angle.

The back glass layer 440 of FIG. 7 is followed by a selectively addressed transistor layer 435 and an LCD layer 430, followed by red/green/blue color filter layers 425. The TFT layer 435 is composed of selectively energized amorphous silicon thin film transistors (TFT) which are coupled to capacitors. The color filter layer 425 is followed by a front glass layer 420. The front glass layer 420 is followed by another compensation film layer 415 (e.g., a birefringence compensation film layer) which is followed by a second or front polarizer layer 410. A protective coating layer 405 is applied to the front of the front polarizer layer 410 and provides a non-glare viewing surface.

It is appreciated that the present invention's use of compensation film layers for improving view angle, in lieu of using dual domain technology as done in the prior art, has several advantages. First of the advantages is a significantly reduced manufacturing process whereby three major steps are used by the present invention rather than 15 steps required of dual domain technology. Namely, the present invention utilizes a first step of applying polyimide, a second step of baking and a third step of rubbing. By reducing the process steps from 15 to 3, thereby eliminating many of the steps required of dual domain techniques, the use of compensation film layers by the present invention significantly reduces manufacturing costs for monitor 216 while improving view angle both vertically and horizontally. It is appreciated that the present invention utilizes the compensation film layers 445 and 415 to increase both horizontal and vertical viewing angles of the monitor 216.

The liquid crystal layer 430 of FIG. 7, in one embodiment of the present invention, is characterized in that it is a twisted nematic liquid crystal layer. In a first alternative embodiment, the liquid crystal layer 430 is an in-plane switching layer for removing the requirement for a molecular pretilt thereby increasing the off-axis viewing capability of monitor 216. In a second alternative embodiment, the liquid crystal layer 430 is an antiferroelectric type material layer also without molecular pretilt thereby increasing the off-axis viewing capability of monitor 216. In both of these alternative embodiments, the compensation film layers 445 and 415 are not required.

The white balance or color temperature of display screen 210 is maintained and adjusted using the two independently controlled light source pairs. The white balance is adjusted by altering the brightness of the light sources pairs independently. The phosphor mix (e.g., contribution of red, green and blue phosphor) of the two light sources pairs is selected so that the white balance can be adjusted by varying the brightness of the light source pairs. The light pipe 340 is acrylic and contains an extraction system that uniformly and independently distributes the light from each light source across the viewing area of the display.

In one embodiment, the light sources are cold cathode fluorescent (CCF) tubes and, in another embodiment, hot cathode fluorescent (HCF) tubes are used. Constraints are placed on the amount of brightness variation tolerated during white adjustment such that the overall brightness of the display never decreases below a percentage of the maximum brightness output by the light sources. In one implementation, this percentage is selected at 70 percent. These constraints limit the selection of appropriate phosphor mixtures with sufficient luminous energy and color temperature.

Figure 8A:
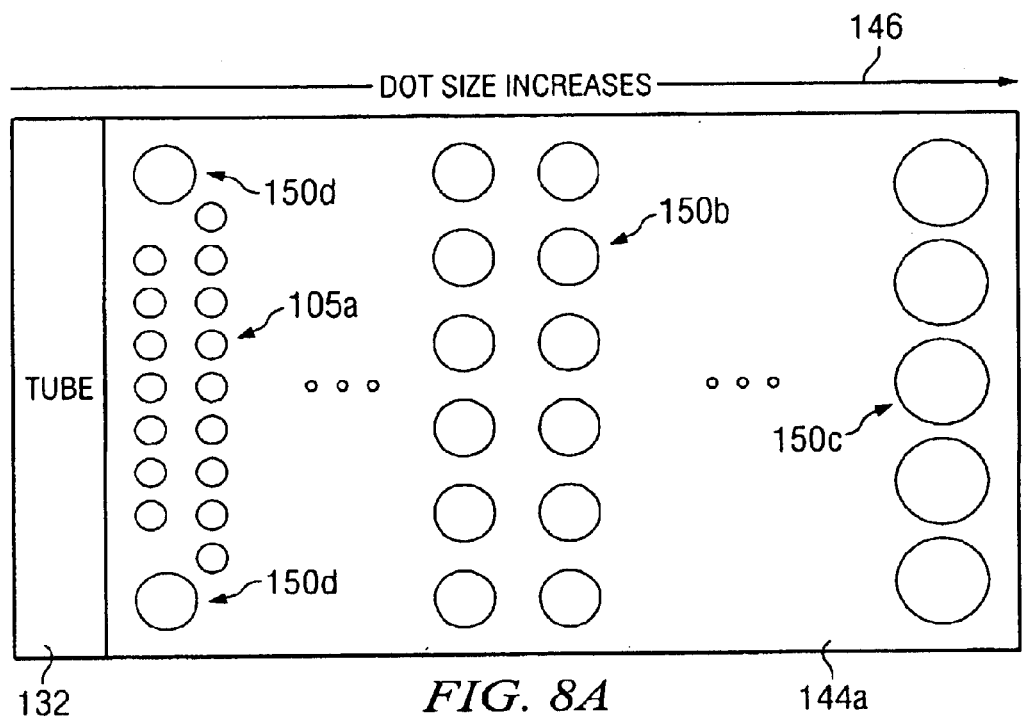
FIG. 8A illustrates an extraction pattern disposed on the surface area of a light pipe in accordance with embodiments of the present invention that use a single edge-disposed light source per light pipe.
Figure 14:
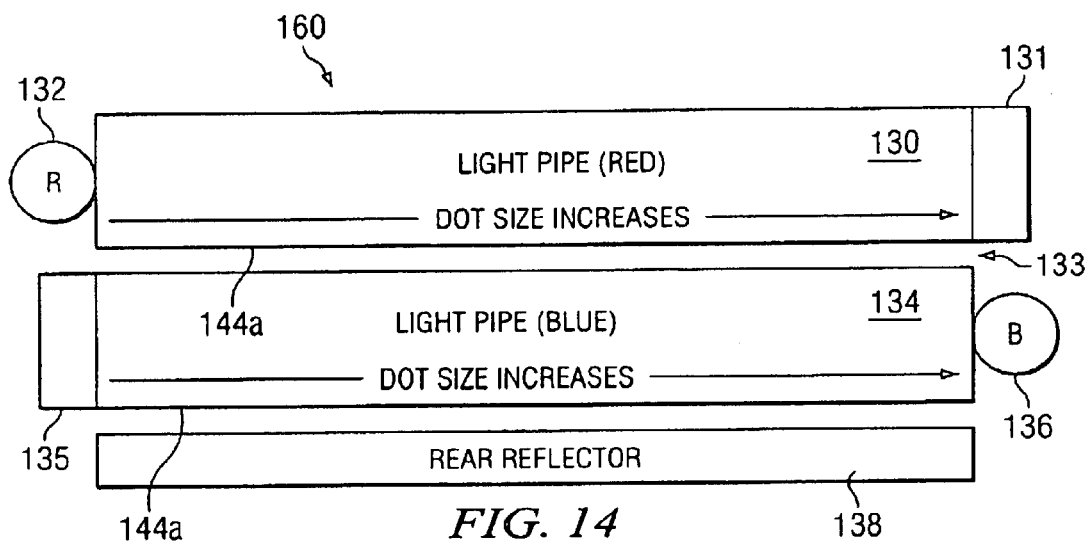
FIG. 14 illustrates a cross section of the lighting configuration of the LCD panel embodiment of FIG. 7 showing the orientation of the extraction patterns in accordance with the present invention.

FIG. 8A illustrates a top view of an exemplary extraction pattern 144a that can be applied to the bottom of light pipe 130 within display screen 210 for a lighting configuration shown in FIG. 14 (having only one tube per light pipe). The extraction pattern 144a is designed to uniformly illuminate the LCD layer 430, at any brightness, taking into consideration that the red tube 132 is positioned along one edge of the light pipe 130. Extraction dots (as described more fully in U.S. Pat. Nos. 5,696,529 and 5,593,221) are applied directly to the surface of their associated light pipe. To accomplish this uniform distribution of light, extraction dots increase in size in a proportion to their distance from the light source 132 as shown in direction 146. Extraction dots 150a are smaller since they are relatively close to the light source 132. Extraction dots 150b are slightly larger since they are relatively farther from to the light source 132 than dots 150a. Extraction dots 150c are the largest because they are the farthest from light source 132. It is appreciated that extraction pattern 144a also includes larger sized dots 150d at the corners near the light source 132 because the tube 132 is not as bright at the ends as in the middle sections of the tube.

Figure 8B:
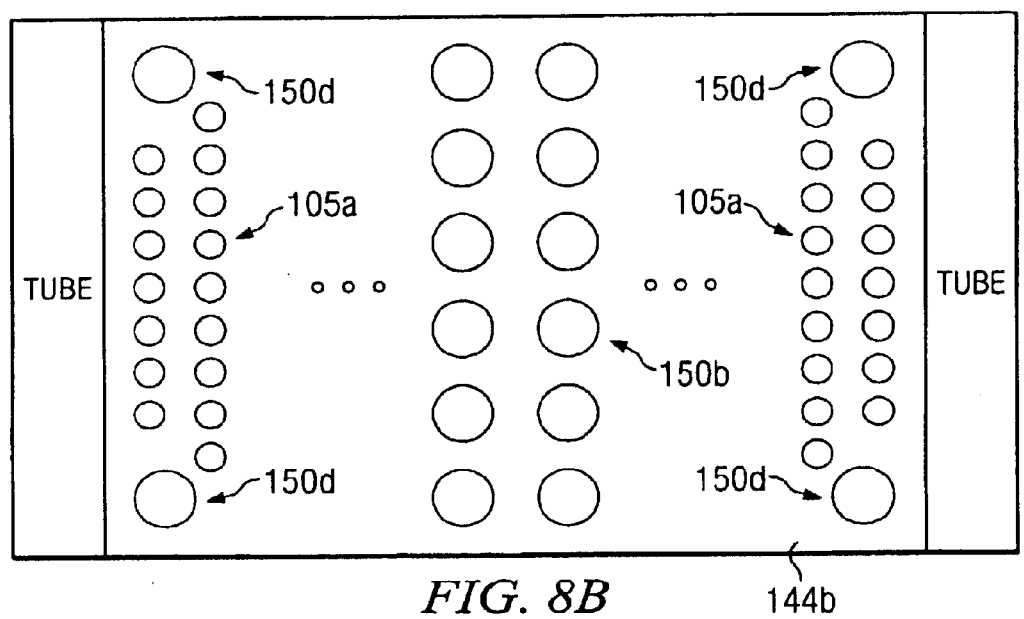
FIG. 8B illustrates an extraction pattern disposed on the surface area of a light pipe in accordance with the preferred embodiments of the present invention that use double edge-disposed light sources per light pipe.

FIG. 8B illustrates a light extraction pattern 144b for the lighting configuration shown in FIG. 7. Light extraction pattern 144b is particularly designed for one or more tubes located on each side of the light pipe. In this case, the dot sizes of the extraction pattern are reverse images of each other (with respect to the middle) with the smaller dots 150a located near the lit edges and the larger dots 150b located in the middle.

FIG. 9 illustrates a cross section of a lighting embodiment 330 for display 210 in accordance with the preferred embodiment of the present invention. As described above, configuration 330 is for providing light to LCD layer 430 (FIG. 7). Lighting embodiment 330 includes a single planar light pipe 340 having a red/blue pair of light sources located on two opposite sides. On the left are located a red light source 312 and a blue light source 316 and on the right are located a red light source 314 and a blue light source 318. The red light sources 312 and 314 of embodiment 330 are varied in tandem and the blue light sources 316 and 318 are varied in tandem, independently from the red light sources 312 and 314. An extraction pattern 144b, as described above, is applied to the underside of light pipe 340.

Color temperature variation is performed for embodiment 330 as described above. The advantage of embodiment 330 is that a single light pipe 340 can be used. Since the brightness of the red and blue light sources are varied in tandem (for a given color), only two inverters are required for embodiment 310 and for embodiment 330.

Figure 10:
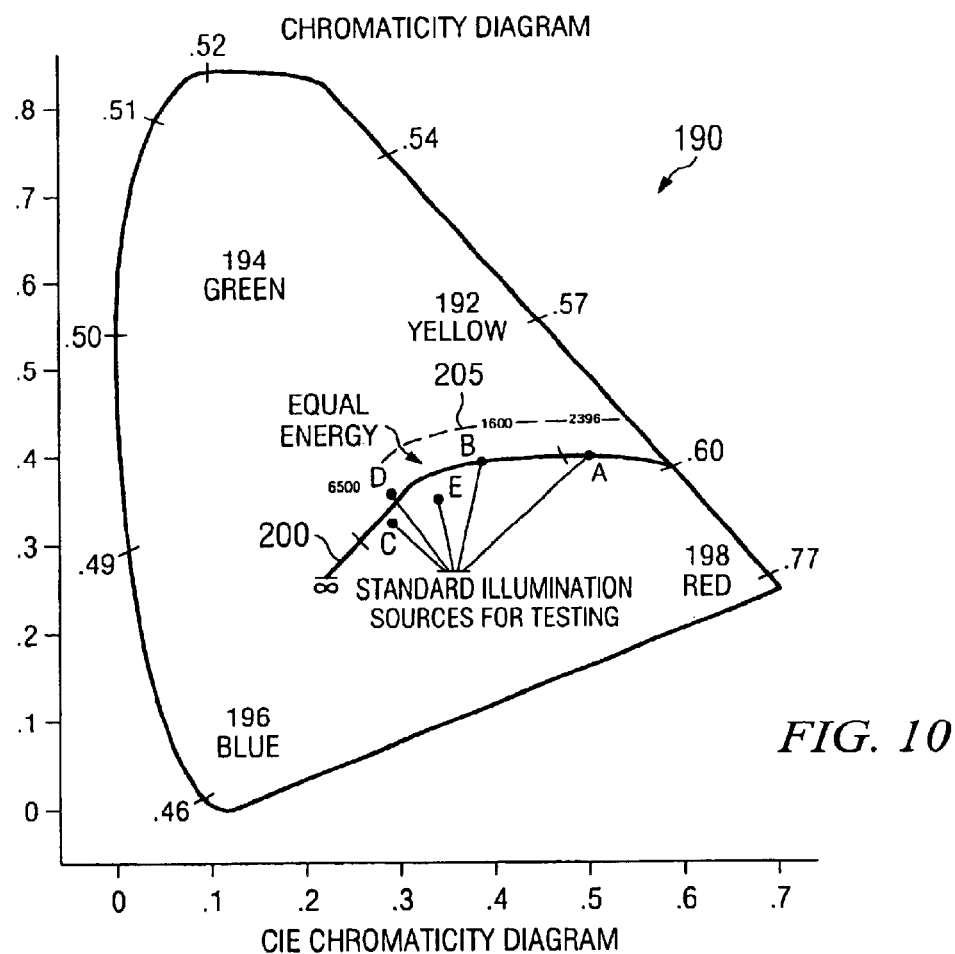
FIG. 10 illustrates the CIE chromaticity diagram including the black body curve from blue to red.

FIG. 10 illustrates a CIE chromaticity diagram 190. When adjusting the color temperature of the display screen 210, in the preferred embodiment, the display holds the daylight white locus curve 205. In another embodiment, the display substantially holds to the black body curve 200 of diagram 190. FIG. 10 illustrates a CIE chromaticity diagram 190 illustrating chromaticity coordinates along the horizontal and vertical. Within the diagram 190, the green portion 194 is toward the top with yellow 192 between green 194 and red 198. Blue 196 is toward the left. A black body curve 200 represents the chromaticity displayed by a tungsten filament heated to various degrees Kelvin.

For instance, from point D to point A along curve 200, the curve represents the color emitted from the tungsten filament from 6,500 degrees K to 2856 degrees K. As shown, the blackbody curve 200 traverses from blue 196 to the red 198 without straying much into the yellow 192 or green 194 regions.

The light sources 132 and 136 (FIG. 14) selected in accordance with the present invention are those that illuminate with a color temperature that is near the daylight white locus curve 205 when their brightness is adjusted within a predetermined color temperature range (e.g., 5,000 to 7,000 K). That is, the color balancing system of the present invention allows adjustments to the color temperature of the flat panel display screen 210 that remain close to the daylight white locus curve 205. An alternate system can have the light sources selected in accordance with the present invention that illuminate with a color temperature that is near the black body curve 200 located below and approximately parallel to the daylight white locus curve 205. The advantage of having the color temperature track the daylight white locus is that the display would be brighter for a given color temperature and more appealing to persons in the desktop publishing field.

Figure 11:
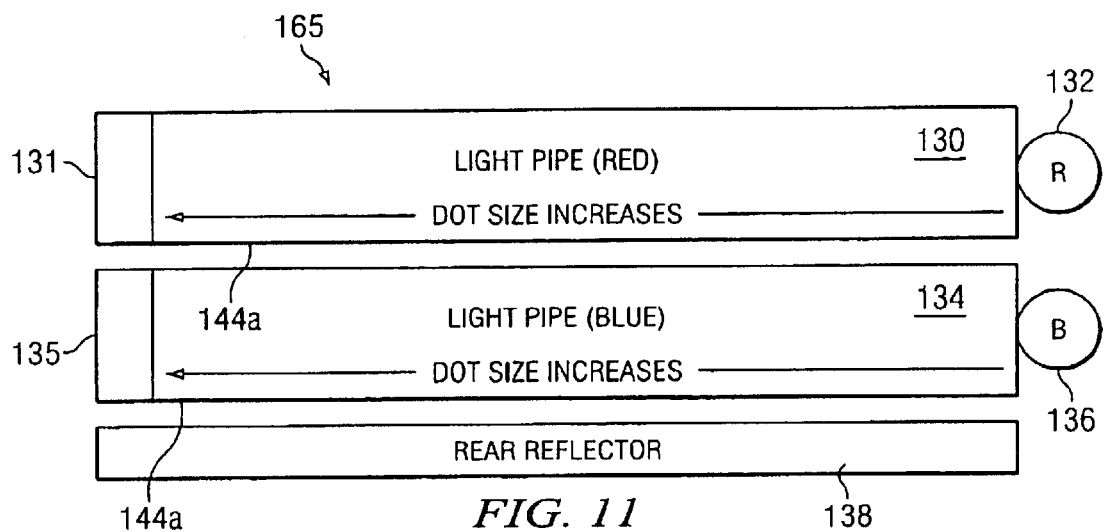
FIG. 11 illustrates a cross section of the lighting configuration for an LCD panel embodiment showing the orientation of extraction patterns in accordance with an embodiment of the present invention.

FIG. 11 illustrates another edge lighting configuration 165 of light pipes and light sources for an alternative embodiment of display 210 taking into consideration the orientation of its light extraction patterns. Configuration 165 is for providing light to LCD layer 430 in lieu of configuration 330. Within configuration 165, two light sources 132 and 136 are aligned on the same edge of the display 210 with no light sources on the other side. Each light extraction pattern 144a is designed to operate with its light pipe (e.g., pipe 130) independently of the other light pipe (e.g., pipe 134). Light extraction pattern 144a is shown in FIG. 11 in cross section as a thin line applied to the underside of light pipe 130. As shown, the dot sizes increase within pattern 144a from right to left because the light source 132 is positioned on the right edge of the light pipe 130. The same (but reversed in direction) light extraction pattern, 144a, is also applied to the underside of light pipe 134. As discussed above, extraction pattern 144a for pipe 134 is the reverse image of pattern 144a for pipe 130 with the dot sizes increasing from right to left because light source 136 is positioned along the right edge of the light pipe 134.

Figure 12:
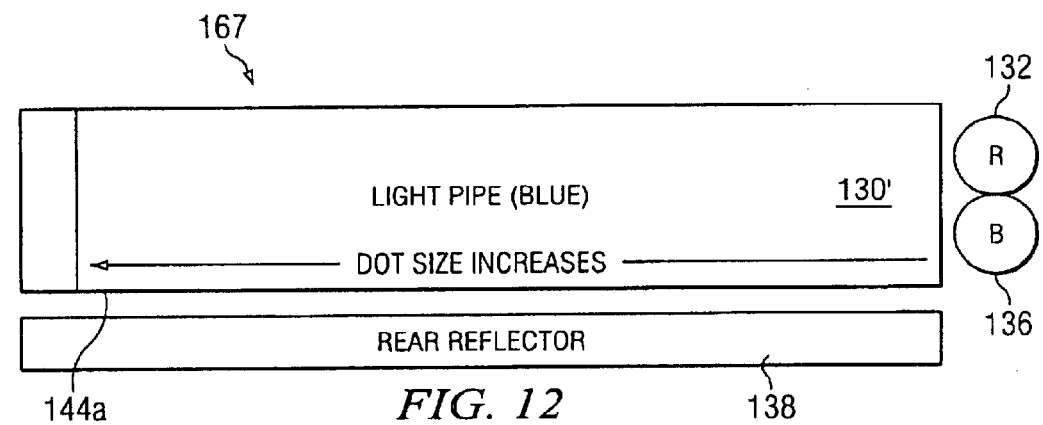
FIG. 12 illustrates a cross section of a lighting configuration variation of the embodiment of FIG. 11 having two variable intensity light sources and a single light pipe for both.

FIG. 12 illustrates a variation 167 of the lighting embodiment 165 of FIG. 11. Configuration 167 is for providing light to LCD layer 430 in lieu of configuration 330. Alternatively, as shown in FIG. 12, this lighting embodiment 167 uses the controls for the first 132 and second 136 light sources in unison to change the display brightness without altering the white balance setting. In configuration 167, both the first and second light sources are positioned on the same side of a single light pipe layer 130' and optically coupled to it. A rear reflector 138 is also used. This embodiment 167 can also be used for color temperature balancing.

Figure 13:
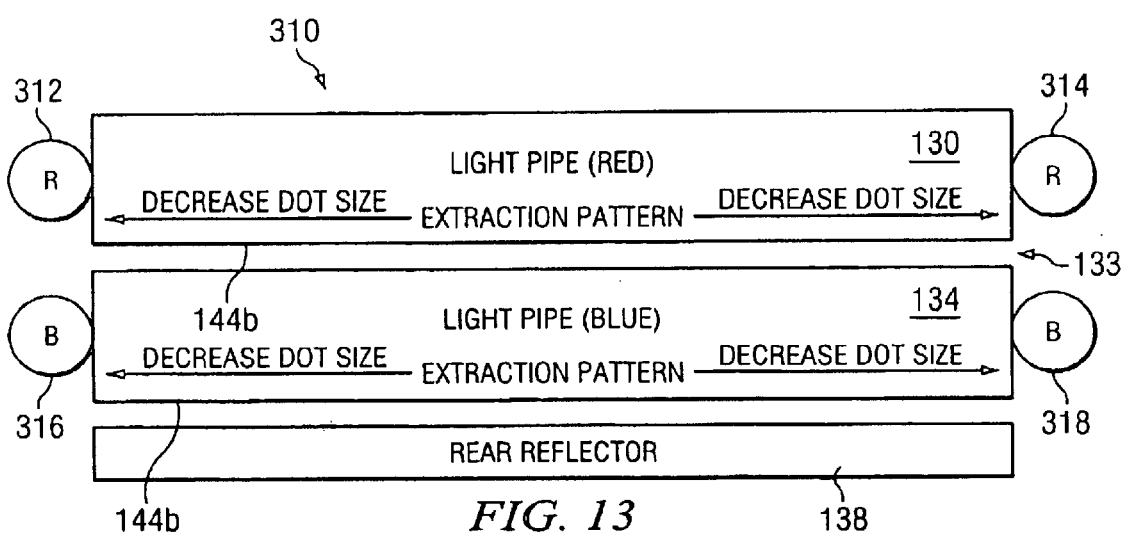
FIG. 13 is a cross sectional diagram of a lighting embodiment of the present invention having dual light pipes and four light sources, two blue sources and two red sources.

FIG. 13 illustrates a cross section of another lighting embodiment 310 for display 210 that utilizes four light sources but two light pipes. Configuration 310 is for providing light to LCD layer 430 in lieu of configuration 330. Two red light sources 312 and 314 are positioned on opposite sides of a planar light pipe 130 and are parallel with each other. The brightness of these two red light sources 312 and 314 are varied in tandem. Two blue light sources 316 and 318 are positioned on opposite sides of a planar light pipe 134 and are parallel with each other. The brightness of these two blue light sources 316 and 318 are varied in tandem independently of the red light sources 312 and 314. It is appreciated that the positions of the blue and red light sources can be switched in accordance with the present invention. Light pipe 134 is positioned under light pipe 130. An air gap 133 is positioned between the light pipes 130 and 134 but is optional in this embodiment because the locations of the red and blue light source pairs are symmetrical with respect to both light pipes 130 and 134. As with embodiment 160, CCFL tubes or HCL tubes can be used as the light sources with particular red, green, blue phosphor contributions to differentiate the blue from the red light sources.

Within embodiment 310, because the brightness of the light sources that are on opposite sides of a same light pipe are varied in tandem, there is a uniform decrease or increase in brightness on both sides of the light pipe (e.g., light pipe 130 or 134). In this case, the extraction pattern 144b applied to the underside of each light pipe 130 and 134 utilizes extraction dots that vary in size with respect to their closest distance from the two light sources. That is, along the sides having the light sources, the extraction dots are smaller and they increase in size (from both sides) toward the middle. An extraction pattern 144b fitting this description is described in U.S. Pat. No. 5,696,529, issued Dec. 9, 1997 by Evanicky, et al., and assigned to the assignee of the present invention.

In accordance with the embodiment 310 of FIG. 13, to vary the color temperature of the display screen 210, the voltage driving the red light sources 312 and 314 is varied to vary their brightness. With the blue light sources 316 and 318 at maximum brightness, the color temperature can be increased from mid-range by dimming down the red light sources 312 and 314 in tandem. Conversely, to vary the color temperature of the display, the voltage of the inverter supply driving the blue light sources 316 and 318 is varied to vary their brightness. With the red light sources 312 and 314 at maximum brightness, the color temperature can be decreased from mid-range by dimming down the blue light sources 316 and 318 in tandem.

Lighting embodiment 310 provides increased brightness through the color temperature variation because more light sources are utilized. Therefore, this embodiment 310 has a larger pool of red/blue light source candidates which allow good color temperature range variation while also providing adequate brightness through the color temperature range. However, since more light sources are used in embodiment 310 over the dual light pipe embodiment 160 (FIG. 14), embodiment 310 consumes more power.

FIG. 14 illustrates a lighting configuration 160 of light pipes and light sources (as shown for display 210 of FIG. 7) taking into consideration the orientation of its light extraction patterns. Configuration 160 is for providing light to LCD layer 430 in lieu of configuration 330.

In the lighting configuration 330 shown in FIG. 14, the red light source 132 is optically coupled to provide light to a first planar light pipe 130. This arrangement is also described in copending U.S. patent application Ser. No. 09/087,745, filed on May 29, 1998, and entitled "A Multiple Light Source Color Balancing System Within A Liquid Crystal Flat Panel Display," by Evanicky and assigned to the assignee of the present invention and incorporated herein. The red light source 132 is positioned along an edge of the light pipe 130. In FIG. 14, only cross sections of this planar light pipe 130 and the light source 132 are shown. Likewise, the blue light source 136 is optically coupled to provide light to a second planar light pipe 134. The blue light source 136 is positioned along an edge of the light pipe 134. Only cross sections of this planar light pipe 134 and the light source 136 are shown. In the embodiment 160 of FIG. 14, the light sources 132 and 136 are long thin tubes which are positioned on opposite sides of the planar light pipes 134 and 130. The light sources 132 and 136 are positioned to be substantially parallel with each other. The power supply for each light source 132 and 136 receives a separate voltage signal for independently controlling its brightness with respect to the other light source. It is appreciated that the positions of the red tube 132 and the blue tube 136 can be switched without departing from the scope of the invention.

In order to maintain independence of the light distribution between the first 130 and second 134 light pipes, an air gap 133 is disposed between the two light pipes. This air gap 133 prevents light from light source 132 being extracted within light pipe 134 and prevents light from light source 136 from being extracted within light pipe 130. The air gap 133 is particularly important for embodiment 160 because each light pipe is illuminated from one edge, and the extraction dot pattern (e.g., a pattern of bumps disposed on the surface of the light pipes) corresponding to that light pipe is specifically tailored for light originating from that edge.

Within display screen 210, each light extraction pattern is designed to operate with its own light pipe (e.g., pipe 130) independently of the other light pipe (e.g., pipe 134). In other words, extraction pattern 144a is designed to uniformly distribute light to the LCD layer 430, independently of light pipe 132, as the brightness of light source 132 varies. Extraction pattern 144b is designed to uniformly distribute light to the LCD layer 430, independently of light pipe 130, as the brightness of light source 136 varies. Light extraction pattern 144a is shown in FIG. 14 in cross section as a thin line applied to the underside of light pipe 130. As shown, the dot sizes increase within pattern 144a from left to right because the light source 132 is positioned on the left edge of the light pipe 130. However, the light extraction pattern 144a applied to the underside of light pipe 134 is the flipped image of pattern 144a with the dot sizes increasing from right to left because light source 136 is positioned along the right edge of the light pipe 134.

Considering the provision of the air gap 133 of FIG. 14 and that each light extraction pattern is tailored for its own light pipe, the light pipes 130 and 134 effectively operate separately and independently to uniformly distribute light over the LCD layer 430. One function of the light extraction patterns is to uniformly distribute light over their associated light pipes even if one lamp is dimmed (or brightened) unilaterally. It is appreciated that the brightness of light source 136 is increased slightly to compensate for the fact that extraction pattern 144a resides between the light pipe 134 and any LCD layer and thereby slightly obstructs the light emitted from light pipe 134. An alternative approach adjusts the sizes of the dots of the relative dot extraction patterns to compensate for the obstruction. On the edges and surrounding the light pipes are reflection tapes 131 and 135.

Figure 15:
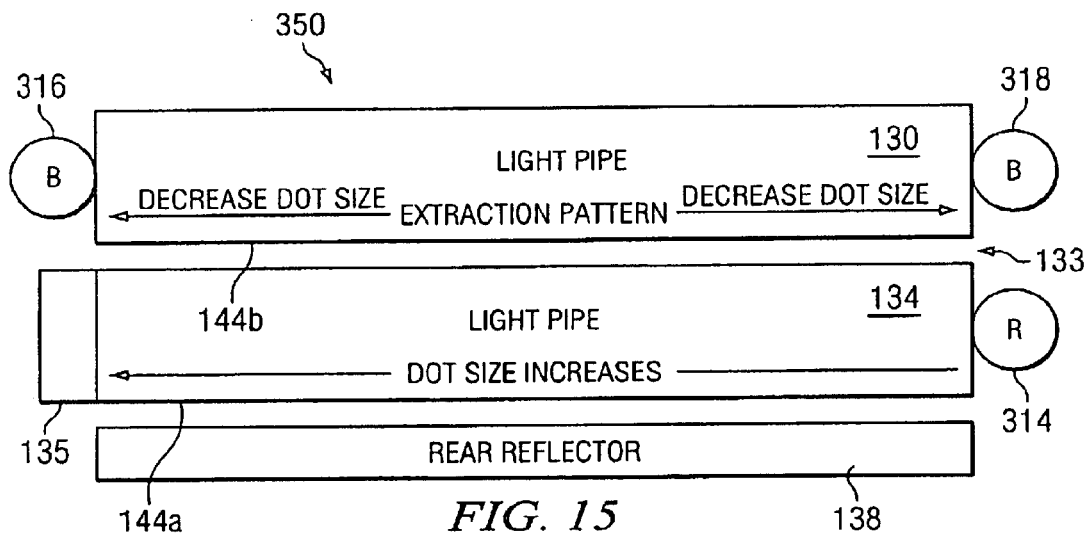
FIG. 15 is a cross sectional diagram of a lighting embodiment of the present invention having dual light pipes and three light sources, two blue sources associated with one light pipe and one red light source that is adjusted for color balancing.

FIG. 15 illustrates a cross section of another lighting embodiment 350 for display screen 210 that utilizes two blue light sources 316 and 318 and a single red light source 314. Lighting configuration 350 is for providing light to LCD layer 430 in lieu of configuration 330. The blue light sources 316 and 318 are positioned along opposite edges of a first light pipe 130. An extraction pattern 144b, as described above, is applied to the underside of light pipe 130. Positioned under light pipe 130 (with an air gap 133 in between) a second light pipe 134. A single red light source 314 is positioned along one edge of light pipe 134 (e.g., on the right or left side). When light source 314 is positioned on the right side, as shown, extraction pattern 144b is used with light pipe 134 and when light source 314 is positioned on the left side, extraction pattern 144a is used.

In operation, the blue light sources 316 and 318 are maintained at (or slightly above) a color temperature above a predetermined color temperature range (e.g., at or above 7,000 K). The blue light sources 316 and 318 are maintained at or near their full brightness to provide the required luminance for the display and the red light source 314 is adjusted in brightness to provide a varying degree of downshifted color temperature. Lighting embodiment 350 provides the advantage that the color temperature of the display can effectively be adjusted without affecting the backlight luminance. That is to say, if the emission spectra of the red lamp is in the deep red region (e.g., 658 nm), then even at its full brightness it would only contribute about 5 percent of the backlight luminance because of the human eye's insensitivity to that color region. It is appreciated that two inverters (FIG. 19) are required for embodiment 350 even though the brightness of light sources 316 and 318 is held constant. Power consumption for the red light source 314 is within the region of 0.5 watt.

Figure 16:
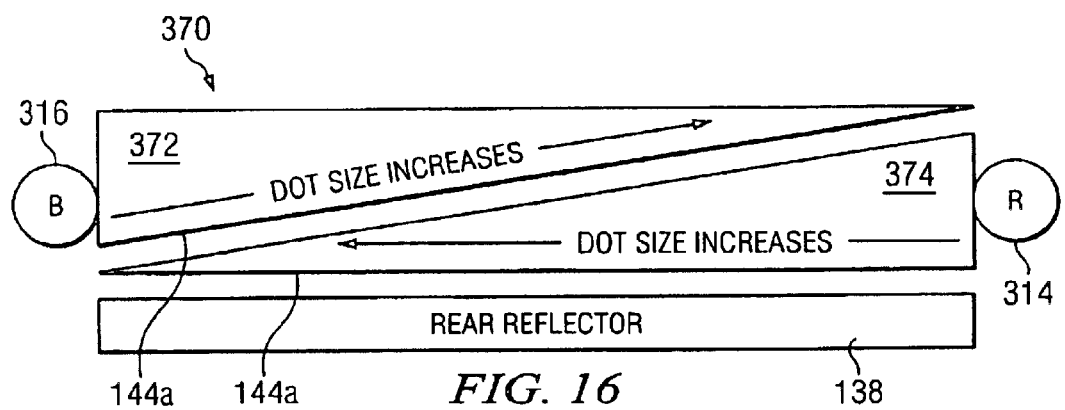
FIG. 16 is a cross sectional diagram of a lighting embodiment of the present invention having two wedge-shaped cross-nested light pipes and two light sources.

FIG. 16 illustrates a cross section of a lighting embodiment 370 of display 210. Configuration 370 is for providing light to LCD layer 430 in lieu of configuration 160. Embodiment 370 is similar to embodiment 160 except the planar light tubes 372 and 374 are wedge-shaped in cross section. The light tubes 372 and 374 are positioned as shown in FIG. 16 so that they have a lower profile in cross section. That is, the light pipes 130 and 134 of embodiment 160, in one implementation, are roughly 3 mm thick so their total width is just over 6 mm when stacked with an air gap 133 in between. However, because the wedge-shaped light pipes 372 and 374 can be positioned as shown in FIG. 16, the overall height of light pipes 372 and 374 is only 3 mm since they are inter-crossed (e.g., cross-nested) together. As shown, a modification of extraction pattern 144a is applied to the underside of light pipe 372 and a modification of extraction pattern 144b is applied to the underside of light pipe 374. The functionality of embodiment 370 similar to embodiment 160 however embodiment 370 offers a much lower profile and reduced weight. A modification of the extraction patter is necessary to compensate for the influence on extraction resulting from the angle of the wedge of each light pipe 372, 374.

Figure 17A:
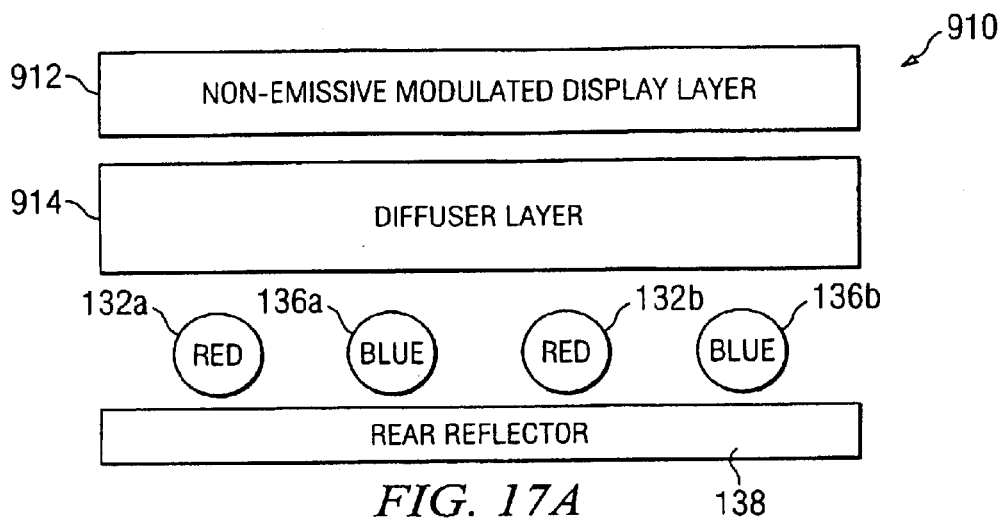
FIG. 17A illustrates a cross section of a backlighting embodiment of the present invention having an array of CCF light sources.
Figure 17B:
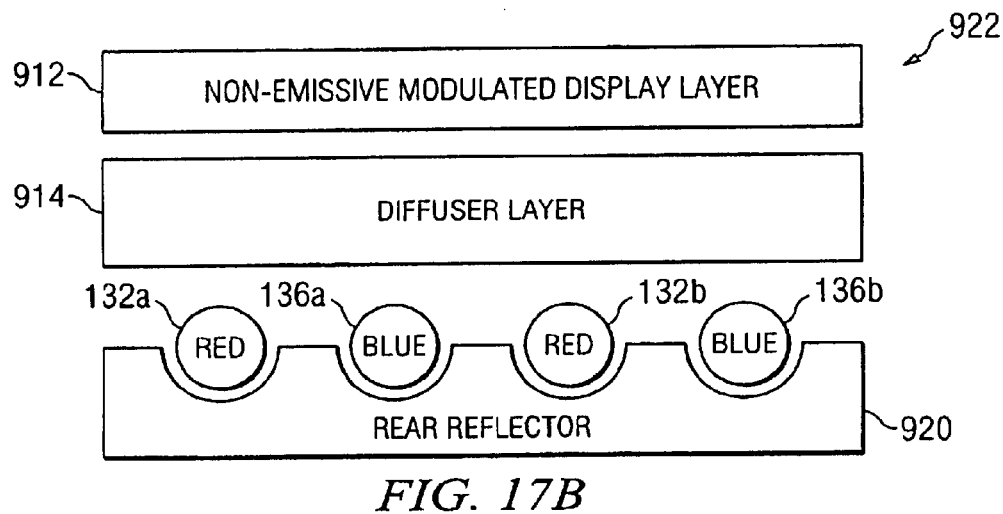
FIG. 17B illustrates a cross section of a backlighting embodiment of the present invention having an array of CCF light sources and a scallop-shaped rear reflector.
Figure 17C:
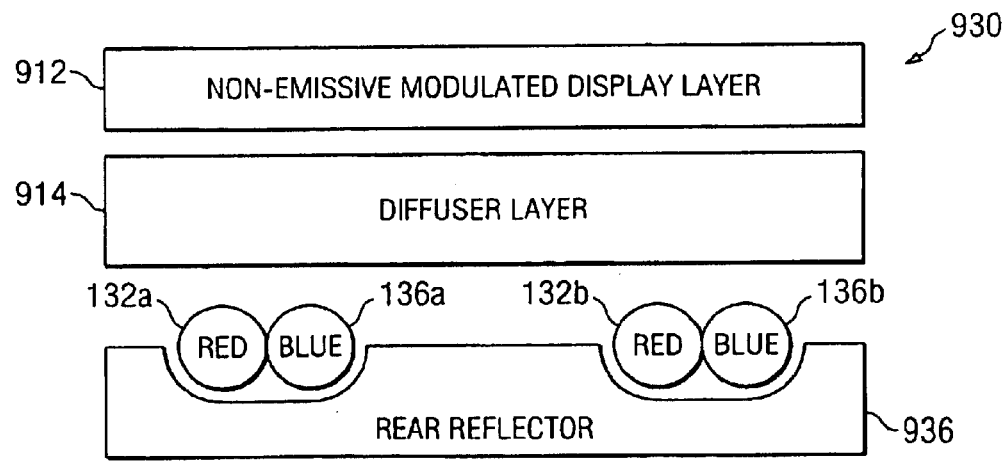
FIG. 17C illustrates a cross section of a backlighting embodiment of the present invention having an array of CCF light sources and a scallop-shaped rear reflector where each scallop has a light source pair.

The LCD layer 430 of display screen 210 can also be lit with direct rear lighting configurations in lieu of the edge lighting configurations 160, 165, 167, 310, 330, 350 and 370 described above. FIGS. 17A, 17B and 17C illustrate some direct rear lighting configurations can be used in lieu of the edge lighting configurations described above.

FIG. 17A illustrates a direct lighting configuration 910 that positions an array of light sources 132a–132b and 136a–136b directly under the display layer 912 thereby obviating the need for any light pipes. In one embodiment, display layer 912 includes layers 405–450 as described with respect to FIG. 7. A diffuser layer 914 of FIG. 17A is used to diffuse the light emitted from the light sources to promote light uniformity. If the light sources are placed near the diffuser layer 914 (e.g., less than one inch away), then hiding lines may be required. These hiding lines are typically etched on the diffuser layer and are more numerous near the body of the light sources. The relative intensities of the light sources (red and blue) can be controlled to perform color temperature balancing as described above in the numerous edge lit embodiments. A rear reflector layer 138 is also used in lighting configuration 910.

The information display layer 912 ("display layer 912") is generally a non-emissive modulated display layer. The layer 912 is non-emissive meaning that it does not generate any original light but rather modules the light of another light source (e.g., sources 132a–132b and 136a136-b). That is to say, the display layer 912 modules light that layer 912 does not generate. Modulation is used to form images on layer 912 thereby conveying information. In one embodiment, display layer 912 includes a liquid crystal display layer of the technology shown in FIG. 7. Alternatively, the display layer 912 can include an electrophoretic display layer using ion migration for modulation, rather than using liquid crystal technology. Layer 912 can also be a reflective display layer or a layer having a fixed modulated design printed or otherwise laid thereon. Layer 912 can also be an electro-mechanical display using shuttered pixels ("windows") for modulation. Layer 912 can also be a ferroelectric display or an antiferroelectric display.

FIG. 17B illustrates another backlighting configuration 922 similar to lighting configuration 910 except the rear reflector 920 contains scallops cut therein and each light source 132a–132b and 136a–136b is positioned with its own scallop to increase directed reflection. FIG. 17C illustrates another backlighting configuration 930 that is similar to embodiment 922 except that within the reflector layer 936 a pair of light sources 132a and 136 can be positioned within a single scallop.

Figure 18:
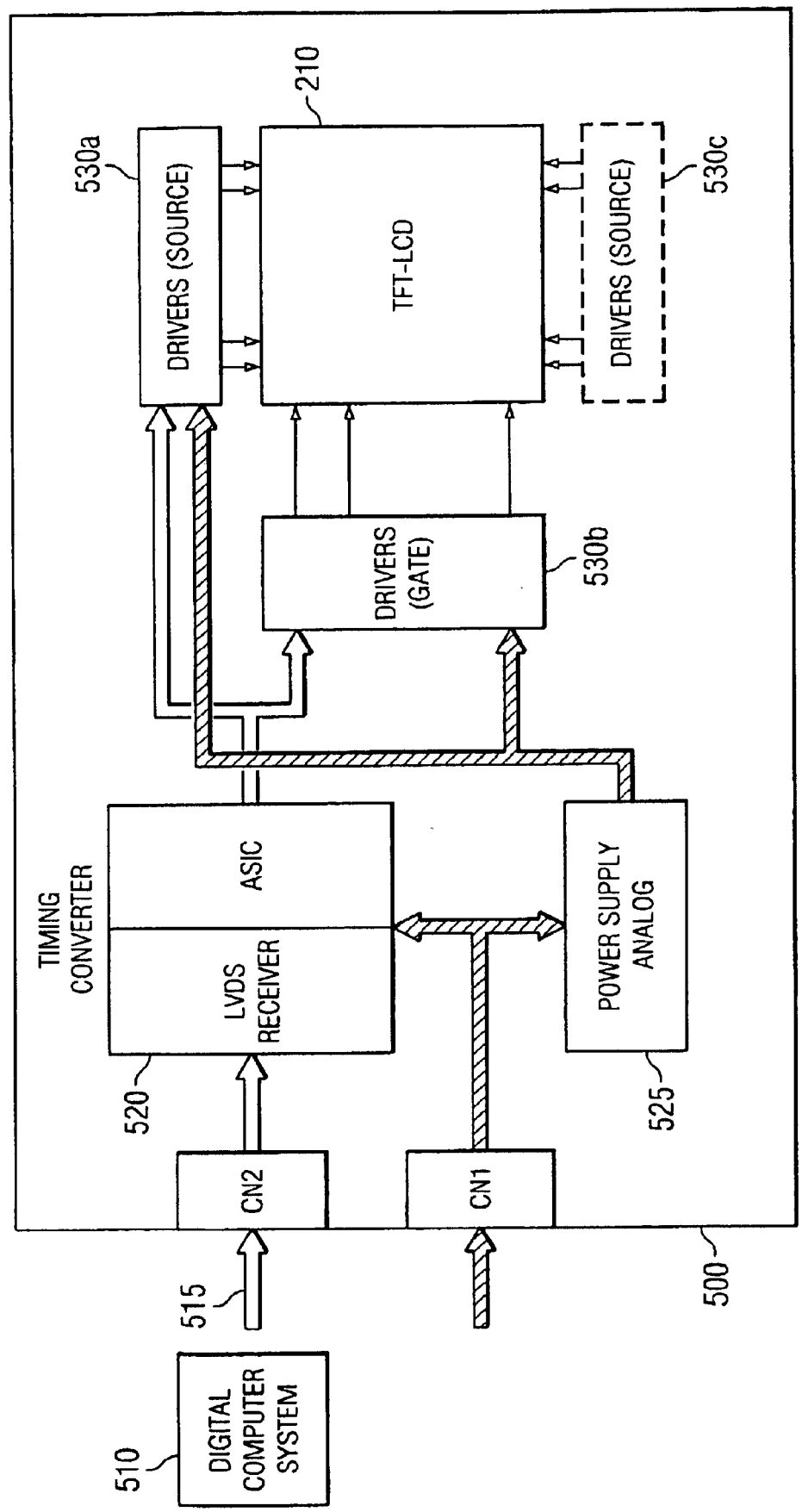
FIG. 18 illustrates driver circuitry for the wide aspect ratio flat panel display of the present invention.

FIG. 18 illustrates LCD control board circuitry 500 used for driving the large screen wide aspect ratio, high resolution, display screen 210 of the present invention. Circuitry 500 is located within display monitor 216 (FIG. 2). Circuitry 500 receives signals from an information originating source, e.g., a computer system 510 as shown in the configuration of FIG. 18. The digital computer system 510 (including a processor coupled to a bus, memory coupled to a bus and one or more user interface devices coupled to the bus) generates display output signals (e.g., video output signals) which are compliant with the low voltage differential voltage signals (LVDS) video format and in one implementation are 85 MHz. These display signals are supplied over a cable (or bus) 515 to an LVDS receiver 520 which also contains timing converter circuitry. The timing converter circuitry and the LVDS receiver 520 can be implemented using application specific integrated circuitry (ASIC) technology.

Although LVDS signal standard is employed in one embodiment of the present invention, other signal transmission standards can also be used by the present invention for the display signal including emitter coupled logic (ECL) and transition minimized differential signaling (TMDS) technologies.

An analog power supply 525 of FIG. 18 provides power signals to drivers 530a–530c for driving the flat panel display 210. Circuit 520 supplies the drivers 530a–530c with timing and data signals compliant with the LVDS signal format. The data signals include color data (RGB) for selectively updated rows of pixels of display screen 210. A pixel on display screen 210 includes one red, one green and one blue pixel. The pixels are organized around red, green and blue stripes and have a uniform pixel pitch within display screen 210. In one embodiment, the pixel pitch is approximately 0.231 mm making display screen 210 approximately 17.3 inches long along the diagonal direction for a high resolution of 1,600 pixels horizontally by 1,024 pixels vertically.

Display screen 210 includes a selectively energized transistor layer 435 (FIG. 7) and each transistor corresponds to a color part of a pixel. Therefore, three transistors are used for each pixel. The rise time (tr) for display 210 is typically 20 ms and the fall time (td) is 30 ms. Each transistor contains a source and a drain. The sources of each transistor are controlled by source driver circuitry 530a and optionally source driver 530c. The gates of each transistor are controlled by gate driver 530b. The display 210 is updated row by row with only one horizontal row of pixels being energized at any given time. All of the rows are energized within a video frame. Update formats can be interlaced or non-interlaced to produce a frame. The data interface for circuitry 500 is described in more detail in copending United States Patent Application entitled "System and Method for Providing a Wide-Aspect Ratio Flat Panel Display Monitor with Independent White-Balance Adjustment and Gamma Correction Capabilities," Ser. No. 09/120,960, filed Jul. 22, 1998, by Evanicky, et al., and assigned to the assignee of the present invention.

Figure 19:
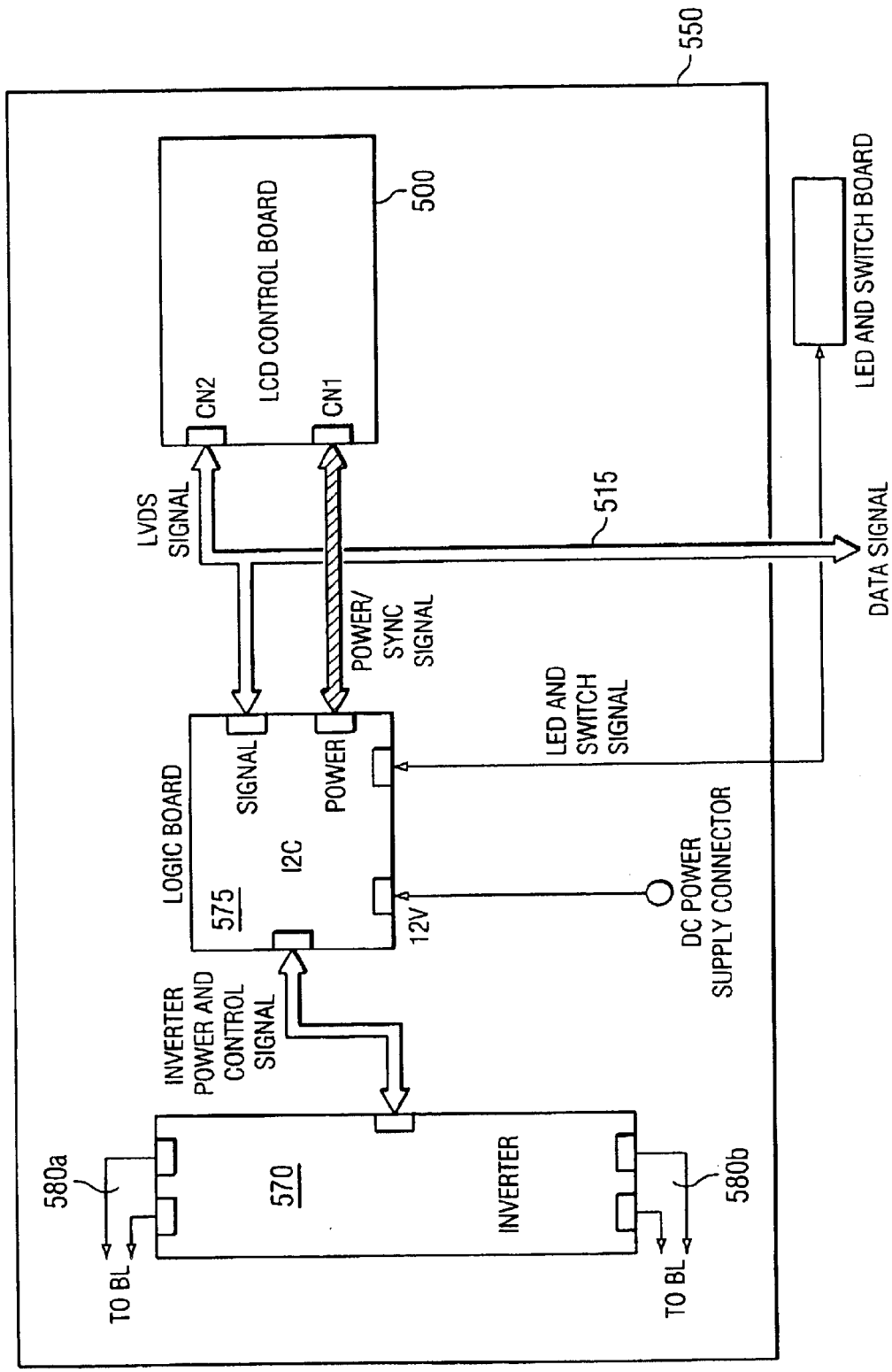
FIG. 19 illustrates control logic for the monitor of the present invention including the driver circuitry of FIG. 18.

FIG. 19 illustrates further circuitry 550 used by the monitor 216. Circuitry 550 includes an LCD control board 500 as described in FIG. 18. Further, circuitry 550 includes the inverter circuits 570 used to control the light sources (e.g., 132 and 136, etc.) described above in the lighting configurations. The inverter circuitry 570 contains the provision for independently providing power to each light source (e.g., an operating voltage of 745 volts with a striking voltage of up to 2,000 volts) thereby allowing independent dimming control of each light source. Each inverter circuit of 570 contains a transformer for supplying a high AC voltage signal to the light sources 132 and 136 and also contains a switch circuit for turning the tubes off. Light sources 132 and 136 are separately coupled to power supply lines 580a–580b. A return bus (not shown) contains a separate return lines from source 132 to one inverter and from source 136 to another inverter 175b. The current supplied to the inverter circuitry 570 is approximately 2 amps. Logic board 575 controls white balancing adjustments and also monitors control timing signals applied to display 210 to ensure proper timing interface. As described with respect to FIG. 18, the LVDS display signals over bus 515 originate from a digital computer system 510.

Figure 20:
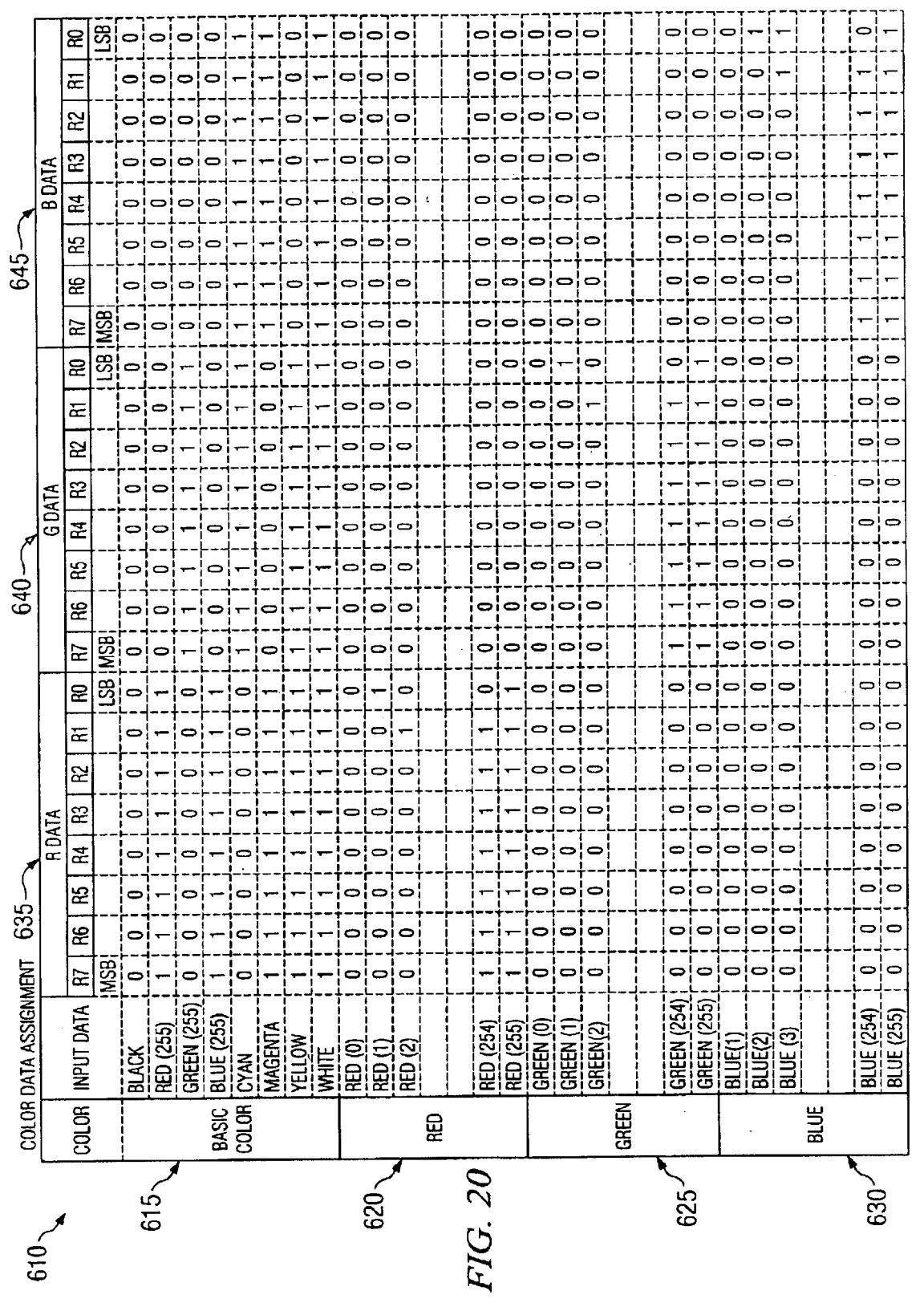

FIG. 20 is a code diagram 610 illustrating the color signals used by the display screen 210 for generating color images thereon with the appropriate resolution as shown. The diagram maps to the red, green and blue digital LVDS interface. Each red, green, blue color is eight bits wide in one embodiment. Values within "( )" indicate gray scale where the larger number means the brighter level. The display mode for display screen 210 is normally white and the color pixel arrangement is RGB vertical stripe. Drivers 530a–530c (FIG. 18) are responsible for driving color signals of the format shown in FIG. 20 to the transistors of display unit 210. It is appreciated that this system would operate in substantially the same (but inverted) manner if the display were a "normally dark" display.

Specifically, row 630 represents the 256 different levels of blue (0–255). As shown, to drive the blue shades, the red and green color data as shown by columns 635 and 640 are zero. The blue data as shown by column 645 increments for each brighter blue shade with darkest (lowest luminous intensity) blue being 0000 0001B and brightest (highest luminous intensity) blue being 1111 1111B. Row 625 represents the 256 different levels of green (0–255). To drive the green shades, the red and blue color data as shown by columns 635 and 645 are zero. The green data as shown by column 640 increments for each brighter green shade with darkest green being 0000 0001 and brightest green being 1111 1111B. Row 620 represents the 256 different levels of red (0–255). Lastly, to drive the red shades, the green and blue color data as shown by columns 640 and 645 are zero. The red data as shown by column 635 increments for each brighter red shade with darkest red being 0000 0001 and brightest red being 1111 1111B.

Row 615 of FIG. 20 represents the color signals for forming the basic colors. Black is made by all color signals being zero (low or selected) as shown along the rows 635, 640 and 645. Full red (255) has column 635 unselected and all other colors off or "selected." Full green (255) has column 640 unselected and all other colors selected. Full blue (255) has column 645 unselected and all other colors selected. Cyan is formed by unselected green 640 and unselected blue 645 and selected red 635. Magenta is formed by unselected red 635 and unselected blue 645 and selected green 640. Yellow is formed by unselected red 635 and unselected green 640 and selected blue 645. White is formed by unselected red 635, unselected green 640 and unselected blue 645. Using the color format shown above, the present invention is capable of generating some 16.7 million different colors from combining 256 shades of each primary.

The colors produced by the display screen 210 of the present invention have the following (x, y) coordinate chromaticity values when the "red" and "blue" lamps are 100% on and at the beginning of their life. Red has x=0.63 and y=0.34. Green has x=0.32 and y=0.58. Blue has x=0.14 and y=0.08. White at maximum luminance of all lamps has x=0.32 and y=0.34 while white at 7,000 degrees Kelvin has x=0.31 and y=0.32 and white at 5,000 degrees Kelvin has x=0.35 and y=0.36.

Figure 21:
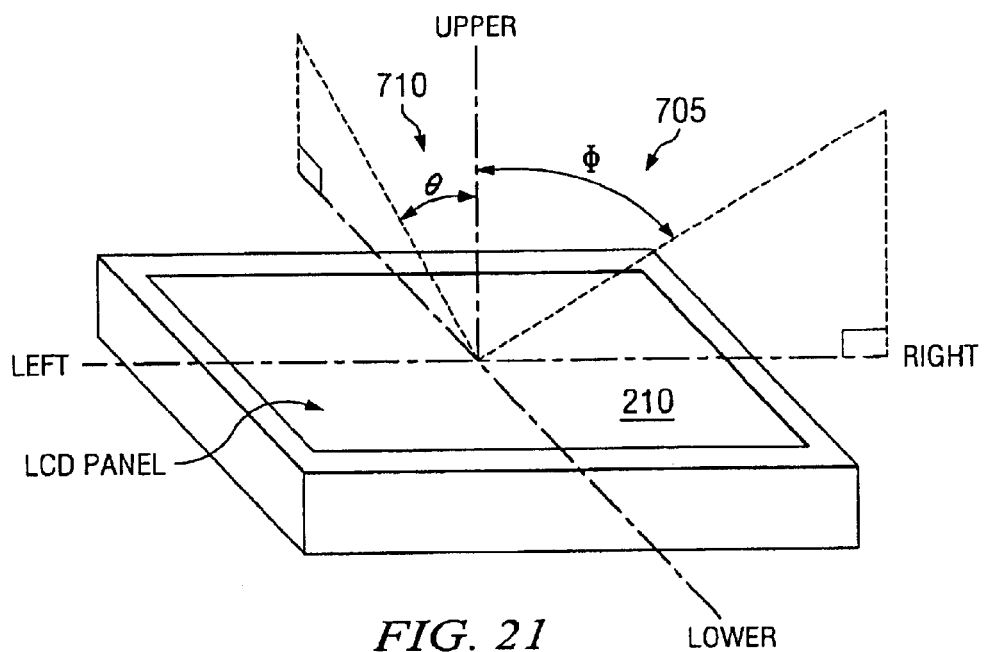
FIG. 21 is an illustration of the horizontal and vertical off axis viewing angle definitions.

FIG. 21 illustrates the off-axis viewing angles provided by the wide aspect ratio flat panel liquid crystal display 210 of the present invention. Angle phi 705 represents the off axis viewing angle from left to right (e.g., in the horizontal direction). Angle theta 710 represents the off axis viewing angle from up to down (e.g., in the vertical direction). Display 210 utilizes the compensation films described with respect to FIG. 7 to increase off-axis viewing angles in both the vertical and horizontal directions. In one embodiment, the compensation films are optical birefringence films. Viewing angle with respect to the horizontal direction (e.g., angle phi 705) is from −60 degrees to 60 degrees maintaining a contrast ratio (CR) of 10 or greater. Likewise, viewing angle with respect to the vertical direction (e.g., angle theta 710) is approximately from −40 degrees to 55 degrees maintaining a contrast ratio of 10 or greater. The contrast ratio is measured by the white on luminance over the black off luminance.

Figure 22A:
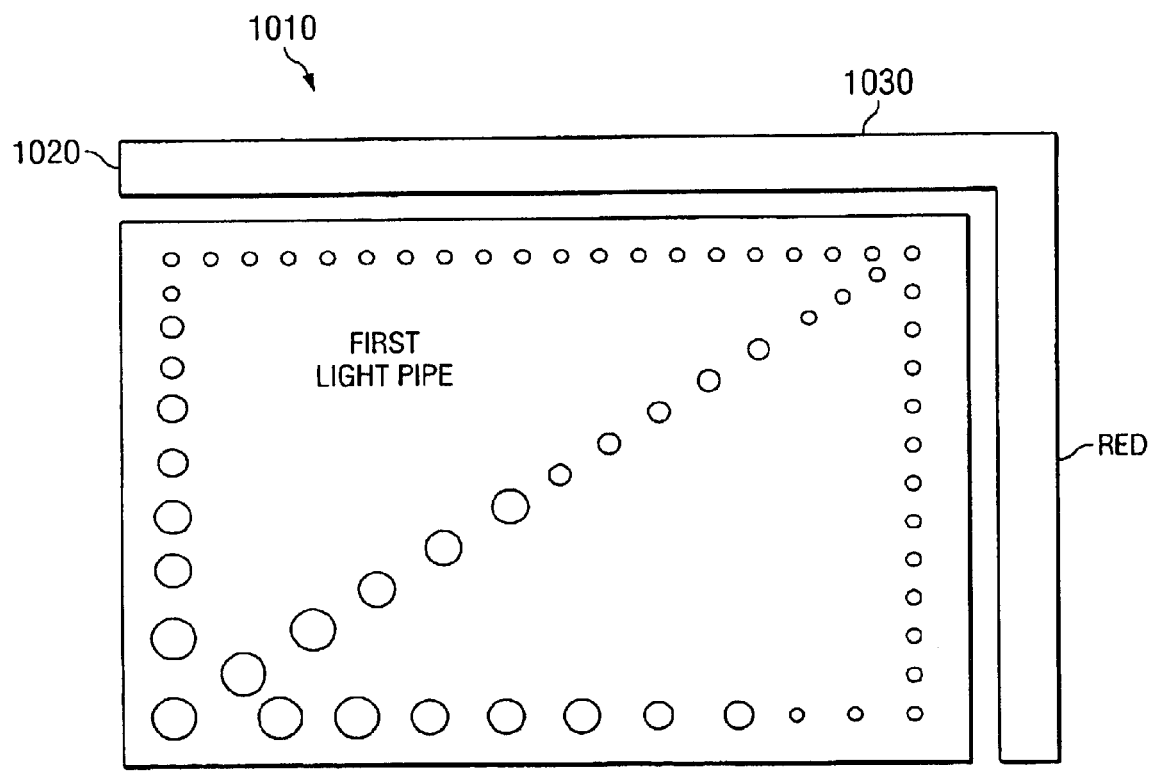
FIG. 22A illustrates an "L" shaped red light source coupled to a light pipe.
Figure 22B:
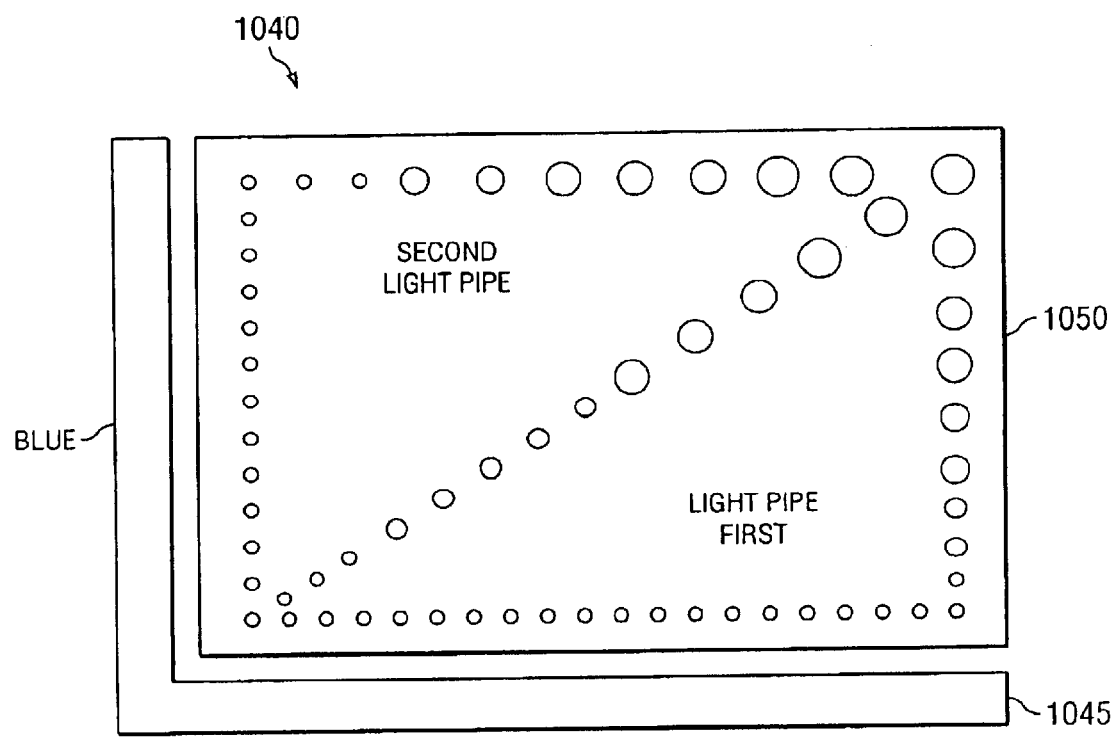
FIG. 22B illustrates an "L" shaped blue light source coupled to a light pipe.
Figure 22C:
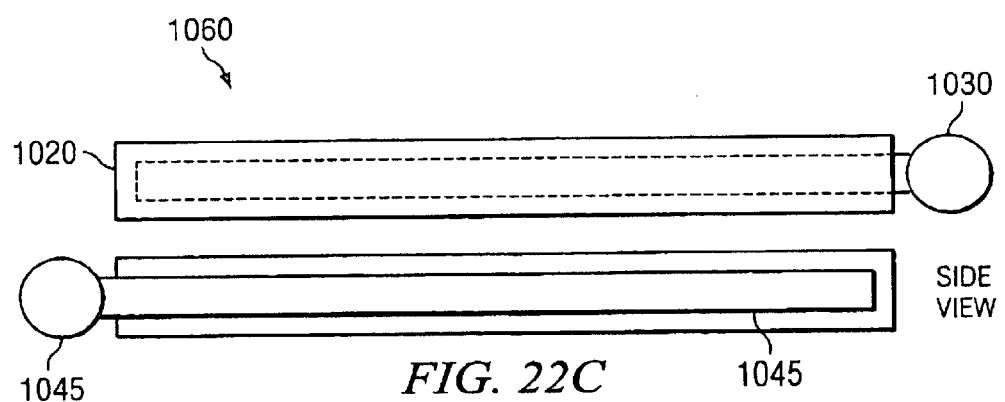
FIG. 22C illustrates a cross section of the "L" shaped adjustable white balance CCF tube backlight system.

FIG. 22A illustrates an "L" shaped red CCF tube 1030 coupled to a light pipe 1020, with extraction pattern, forming another lighting configuration 1010 that can be used with the LCD flat panel display 210. FIG. 22B illustrates an "L" shaped blue CCF tube 1045 coupled to a light pipe 1050, with extraction pattern, forming another lighting configuration 1040 that can be used with the LCD flat panel display 210. FIG. 22C illustrates a cross section of a lighting configuration 1060 of the "L" shaped adjustable white balance CCF tube backlight system. In the above system, a wide aspect large area liquid crystal flat panel display, as described above, can be coupled receive light from the lighting configuration. The wide aspect large area liquid crystal flat panel display has a net color temperature that is dependent on the intensity of the two "L" shaped light sources with respect to each other.

It is appreciated that within embodiments of the present invention, the light sources described herein (e.g., sources 132 and 136) can be composed of light emitting diodes (LEDs) of different color temperatures. It is appreciated that the light sources can also be each composed of an array of low voltage or high voltage phosphors with two color temperature mixes, each energized by two separately controlled arrays of field emission cathode devices. It is further appreciated that the light sources can be each composed of an array of light emitting polymers with two color temperatures each energized by two separately controlled energy sources.

Because the flat panel display 210 of the present invention is digitally addressed in an (x, y) matrix of pixels over the entire area of the display, rather than from a single point, addressing the extreme right/left edges or the corners of the display is not more difficult than addressing the pixels at the center of the screen 210. Also, since the pixels of the display screen 210 are positioned in a definite, permanent location and not dependent upon the stability, intensity and accuracy of a traveling Gaussian beam, the image of the present invention is inherently more stable. This results in much less eye fatigue from a desktop publishing user who often stares for hours at the display screen 210. Additionally, the present invention couples the above advantages with white balance mechanisms that do not alter the dynamic grayscale range of the RGB colors. Therefore, the flat panel display 210 of the present invention is ideally suited to high information content displays, e.g., for desktop publishing, tactical displays, photography, etc., with correct and uniform colorimetry.

The monitor 216 of the present invention is also particularly well suited for the display of text, graphics and other types of still and/or motion audio/visual works due to its high resolution image display capabilities, its large area and its wide aspect ratio. The wide aspect ratio allows the display of multiple pages, side-by-side, thereby facilitating certain tasks such as desktop publishing, presentation of interactive windows, presentation of menus, chart viewing, digital photography, tactical military displays and weather and aircraft monitoring. The novel wide aspect ratio monitor 216 provides the compensation film layers, rather than dual domain technology, for providing off axis viewing capability in the horizontal and vertical directions. The novel wide aspect ratio monitor 216 also provides white color balance adjustment.

The preferred embodiment of the present invention, a large area flat panel liquid crystal monitor having a wide aspect ratio display screen that has high resolution for the display of high information content, is thus described. While the present invention has been described in particular embodiments, it should be appreciated that the present invention should not be construed as limited by such embodiments, but rather construed according to the below claims.

What is claimed is:

1. A monitor comprising:
   a large area wide aspect ratio liquid crystal flat panel display screen, said large area wide aspect ratio liquid crystal flat panel display screen having a liquid crystal layer, said large area wide aspect ratio liquid crystal flat panel display screen including optical compensation film for providing increased off axis angle viewing capability in both the vertical and horizontal directions, said large area wide aspect ratio liquid crystal flat panel display screen including a brightness enhancement layer operable to re-direct light radiating at extreme angles in order to increase light to said liquid crystal layer, said large area wide aspect ratio liquid crystal flat panel display screen including a first light pipe operable to illuminate said liquid crystal layer, said large area wide aspect ratio liquid crystal flat panel display screen having an air gap disposed between said brightness enhancement layer and said optical compensation film with said brightness enhancement layer being disposed between said first light pipe and said air gap; and
   electronic circuitry for receiving signals from a digital computer system and for driving said large area wide aspect ratio liquid crystal flat panel display screen.

2. A monitor as described in claim 1 wherein said large area wide aspect ratio liquid crystal flat panel display screen has an aspect ratio of approximately 1.6:1.

3. A monitor as described in claim 1 further comprising a height adjustable stand coupled to support said large area wide aspect ratio liquid crystal flat panel display screen.

4. A monitor as described in claim 1 wherein said large area wide aspect ratio liquid crystal flat panel display screen has high resolution for displaying high information content, said high information content includes text information.

5. A monitor as described in claim 1 wherein said large area wide aspect ratio liquid crystal flat panel display screen has high resolution for displaying high information content, said high information content includes graphics image information.

6. A monitor as described in claim 1 wherein said liquid crystal layer provides in-plane switching for improved viewing angle.

7. A monitor as described in claim 1 wherein said liquid crystal layer includes anti-ferroelectric material for improved viewing angle.

8. A monitor as described in claim 1 wherein said large area wide aspect ratio liquid crystal flat panel display screen comprises a plurality of pixels having a uniform pixel pitch of approximately 0.23 mm.

9. A monitor as described in claim 1 wherein said large area wide aspect ratio liquid crystal flat panel display screen is non-emissive and further comprising:
   a first light source of a first color temperature; and
   a second light source of a second color temperature different from said first color temperature, said first and second light sources positioned to illuminate said large area wide aspect ratio liquid crystal flat panel display screen with light having a net color temperature that is dependent on an intensity of said first light source and an intensity of said second light source wherein said first and said second light sources alter said net color temperature of said light, within a predetermined color temperature range, by controlling said intensity of said first light source and said intensity of said second light source.

10. A monitor as described in claim 9, wherein said first and second light pipes include an extraction pattern operable to provide uniform illumination from the first and second light sources.

11. A monitor as described in claim 10, wherein the extraction pattern of each of the first and second light pipes includes extraction dots of varying sizes.

12. A monitor as described in claim 9 wherein the first and second light sources are composed of light emitting diodes (LEDs) of different color temperatures.

13. A monitor as described in claim 9 wherein the first and second light sources are each an array of low voltage or high voltage phosphors with two color temperature mixes, each energized by two separately controlled arrays of field emission cathode devices.

14. A monitor as described in claim 9 wherein the first and second light sources are each an array of light emitting polymers with two color temperatures each energized by two separately controlled energy sources.

15. A monitor comprising:
   a wide aspect ratio liquid crystal flat panel display screen, said wide aspect ratio liquid crystal flat panel display screen having a liquid crystal layer, said wide aspect ratio liquid crystal flat panel display screen including optical compensation film for providing increased off axis angle viewing capability in both the vertical and horizontal directions, said wide aspect ratio flat panel display screen including a brightness enhancement layer operable to re-direct light radiating at extreme angles in order to increase light to said liquid crystal layer, said wide aspect ratio flat panel display screen including a first light pipe liquid crystal layer, said wide aspect ratio flat panel display screen having an air gap disposed between said brightness enhancement layer and said optical compensation film with said brightness enhancement layer being disposed between said first light pipe and said air gap; and
   electronic circuitry for receiving signals from an information originating source and for driving said wide aspect ratio liquid crystal flat panel display screen.

16. A monitor as described in claim 15 wherein said wide aspect ratio liquid crystal flat panel display screen has a pixel pitch of approximately 0.23 mm.

17. A monitor as described in claim 15 further comprising a height adjustable stand coupled to support said wide aspect ratio liquid crystal flat panel display screen and wherein said information originating source is a computer system.

18. A monitor as described in claim 15 wherein said wide aspect ratio liquid crystal flat panel display screen having high resolution for displaying high information content wherein said high resolution is compatible with the SXGA-Wide standard, said high information content includes text information.

19. A monitor as described in claim 18, wherein said high information content also includes graphics image information.

20. A monitor as described in claim 15 wherein said liquid crystal layer provides in-plane switching.

21. A monitor as described in claim 15 wherein said liquid crystal layer includes an anti-ferroelectric material for improved viewing angle.

22. A monitor as described in claim 15 wherein said wide aspect ratio liquid crystal flat panel display screen is non-emissive and further comprising:
a first light source optically coupled to provide light to said first light pipe, said first light source having a color temperature that is below the minimum color temperature of a predetermined color temperature range;
a second light source optically coupled to provide light to a second light pipe, said second light source having a color temperature that is above the maximum color temperature of said color temperature range; and
a circuit coupled to said first and said second light sources for setting a color temperature of said flat panel display by selectively and independently varying the brightness of said first light source and the brightness of said second light source.

23. A monitor comprising:
a wide aspect ratio liquid crystal flat panel display screen, said wide aspect ratio liquid crystal flat panel display screen having high resolution for displaying high information content wherein said high resolution comprises 1600 pixels horizontally and 1024 pixels vertically, said wide aspect ratio liquid crystal flat panel display screen including birefringence compensation film for providing increased off axis angle viewing capability in both the vertical and horizontal directions, said wide aspect ratio liquid crystal flat panel display screen including a brightness enhancement layer operable to re-direct light radiating at extreme angles in order to increase light to said large area wide aspect ratio liquid crystal flat panel display screen, said wide aspect ratio liquid crystal flat panel display screen including a first light pipe operable to illuminate said wide aspect ratio liquid crystal flat panel display screen, said wide aspect ratio liquid crystal flat panel display screen having an air gap disposed between said birefringence compensation film and said brightness enhancement layer with said brightness enhancement layer being disposed between said first light pipe and said air gap; and
electronic circuitry for receiving signals from an information originating source and for driving said wide aspect ratio liquid crystal flat panel display screen.

24. A monitor as described in claim 23 wherein said information originating source is a computer system.

25. A monitor as described in claim 23 wherein said high information content includes text information.

26. A monitor as described in claim 25 wherein said high information content also includes graphics image information.

27. A monitor as described in claim 23 wherein said wide aspect ratio liquid crystal flat panel display screen comprises an in-plane switching liquid crystal layer.

28. A monitor as described in claim 23 wherein said wide aspect ratio liquid crystal flat panel display screen comprises a liquid crystal layer of an anti-ferroelectric material for improved viewing angle.

29. A monitor as described in claim 23 wherein said wide aspect ratio liquid crystal flat panel display screen is non-emissive and further comprising:
a first light source of a first color temperature; and
a second light source of a second color temperature different from said first color temperature, said first and second light sources positioned to illuminate said wide aspect ratio liquid crystal flat panel display screen with light having a net color temperature that is dependent on an intensity of said first light source and an intensity of said second light source wherein said first and said second light sources alter said net color temperature of said light, within a predetermined color temperature range, by controlling said intensity of said first light source and said intensity of said second light source.

30. A monitor comprising:
a lighting configuration comprising:
a first "L" shaped light source of a first color temperature;
a second "L" shaped light-source of a second color temperature;
a first planar light pipe coupled to receive light from said first "L" shaped light source wherein two sides of said first planar light pipe receive light from said first "L" shaped light source; and
a second planar light pipe coupled to receive light from said second "L" shaped light source wherein two sides of said second planar light pipe receive light from said second "L" shaped light source, said second planar light pipe being separated from said first planar light pipe by an air gap to maintain light distribution independence between said first and second planar light pipes; and
a wide aspect large area liquid crystal flat panel display operable to receive light from said lighting configuration, said wide aspect large area liquid crystal flat panel display having a net color temperature that is dependent on the intensity of said first and second "L" shaped light sources with respect to each other, said wide aspect large area liquid crystal flat panel display including optical compensation film for providing increased off axis angle viewing capability in both the vertical and horizontal directions, said wide aspect large area liquid crystal flat panel display including a brightness enhancement layer operable to re-direct light radiating at extreme angles in order to increase light to said wide aspect large area liquid crystal flat panel display, said wide aspect large area liquid crystal flat panel display including an air gap between said optical compensation film and said brightness enhancement layer with said brightness enhancement layer being disposed between said first planar light pipe and said air gap.

* * * * *

UNITED STATES PATENT AND TRADEMARK OFFICE
CERTIFICATE OF CORRECTION

| | | |
|---|---|---|
| PATENT NO. | : 6,816,145 B1 | Page 1 of 1 |
| APPLICATION NO. | : 09/120983 | |
| DATED | : November 9, 2004 | |
| INVENTOR(S) | : Evanicky | |

It is certified that error appears in the above-identified patent and that said Letters Patent is hereby corrected as shown below:

Col. 20, line 56 should read as follows:

-- including a first light pipe operable to illuminate said liquid crystal layer, said side --

Signed and Sealed this

Sixth Day of December, 2011

David J. Kappos
*Director of the United States Patent and Trademark Office*